United States Patent [19]
Hoffa

[11] Patent Number: 5,375,485
[45] Date of Patent: Dec. 27, 1994

[54] WIRE AND CABLE CUTTING AND STRIPPING USING SLIDABLE INTERFITTING BLADES WITH COMPLEMENTARY CONFIGURATIONS

[75] Inventor: Jack L. Hoffa, Brea, Calif.

[73] Assignee: Eubanks Engineering Company, Monrovia, Calif.

[21] Appl. No.: 22,981

[22] Filed: Feb. 25, 1993

Related U.S. Application Data

[63] Continuation-in-part of Ser. No. 857,972, Mar. 26, 1992, Pat. No. 5,293,683, which is a continuation-in-part of Ser. No. 659,557, Feb. 22, 1991, which is a continuation-in-part of Ser. No. 611,057, Nov. 9, 1990, Pat. No. 5,146,673.

[51] Int. Cl.$^5$ ............................................. H02G 1/12
[52] U.S. Cl. ...................................... 81/9.51; 29/825; 81/9.4
[58] Field of Search ...................... 81/9.4, 9.51; 29/825

[56] References Cited

U.S. PATENT DOCUMENTS

| | | |
|---|---|---|
| 1,433,320 | 10/1922 | Wersel . |
| 1,477,678 | 12/1923 | Wetmore . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 4/1959 | Harris . |
| 2,934,982 | 5/1960 | Eubanks . |
| 3,176,550 | 4/1965 | Marcotte . |
| 3,222,957 | 12/1965 | Kramer et al. . |
| 3,292,462 | 12/1966 | Turecek et al. . |
| 3,309,948 | 3/1967 | Falken . |
| 3,368,428 | 2/1968 | Gudmestad . |
| 3,376,627 | 4/1968 | Sitz . |
| 3,479,718 | 11/1969 | Van De Kerkhof et al. . |
| 3,552,449 | 1/1971 | Woodward . |
| 3,570,100 | 3/1971 | Kindell et al. . |
| 3,604,291 | 9/1971 | Weidner . |
| 3,614,905 | 10/1971 | Bieganski . |
| 3,645,156 | 2/1972 | Meyer et al. . |
| 3,653,412 | 4/1972 | Gudmestad . |
| 3,701,301 | 10/1972 | Gudmestad . |
| 3,769,681 | 11/1973 | Eubanks . |
| 3,838,612 | 10/1974 | Inami . |
| 3,857,306 | 12/1974 | Gudmestad . |
| 3,857,313 | 12/1974 | Endo . |

(List continued on next page.)

FOREIGN PATENT DOCUMENTS

| | | |
|---|---|---|
| 2525402 | 4/1982 | France . |
| 2525403 | 7/1984 | France . |
| 2513478 | 2/1985 | France . |
| 2927235 | 8/1980 | Germany . |
| 609834 | 10/1948 | United Kingdom . |
| 1216815 | 7/1986 | U.S.S.R. . |

OTHER PUBLICATIONS

*Standard Logic Catalogue*, "EWS-6K Electronic Wire Stripper", Feb. 1974.
Artos Catalog Sheet, "Single Blade, Fully-Automatic Wire Processing", 1989.
*Komas 33* Catalogue Sheet, 1988.

*Primary Examiner*—Carl J. Arbes
*Attorney, Agent, or Firm*—William W. Haefliger

[57] ABSTRACT

For use in apparatus for processing wire to cut the wire into sections and to expose section wire ends, the wire having an inner core and sheathing about the core, the apparatus including structure for displacing the wire axially endwise, comprising multiple blade structures, including at least two of the structures that mutually interfit as the two structures move relatively oppositely toward and away from the axis in directions generally normal to the axis; at least one of the two structures defining first shoulders elongated in the directions and forming a space between which the other of the two structures extends during the relative movement, each of the two structures having an associated concave cutting edge, the cutting edge or edges located between the first shoulders.

19 Claims, 28 Drawing Sheets

U.S. PATENT DOCUMENTS

| | | |
|---|---|---|
| 3,869,781 | 3/1975 | Eubanks et al. . |
| 3,872,584 | 3/1975 | Chick et al. . |
| 3,881,374 | 5/1975 | Gudmestad . |
| 3,918,330 | 11/1975 | Blaha . |
| 3,921,472 | 11/1975 | Gudmestad et al. . |
| 3,927,590 | 12/1975 | Gudmestad et al. . |
| 4,009,738 | 3/1977 | Baba et al. . |
| 4,027,557 | 6/1977 | Stepan . |
| 4,091,695 | 5/1978 | Funcik et al. . |
| 4,112,791 | 9/1978 | Wiener . |
| 4,156,961 | 6/1979 | Agoh . |
| 4,164,808 | 8/1979 | Gudmestad et al. . |
| 4,165,768 | 8/1979 | Gudmestad . |
| 4,166,315 | 9/1979 | Gudmestad et al. . |
| 4,175,316 | 11/1979 | Gudmestad . |
| 4,194,281 | 3/1980 | Gudmestad . |
| 4,238,981 | 12/1980 | Karl . |
| 4,244,101 | 1/1981 | Talley . |
| 4,261,230 | 4/1981 | Sindelar . |
| 4,266,455 | 5/1981 | Ago . |
| 4,275,619 | 6/1981 | Shimizu . |
| 4,327,609 | 5/1982 | Resch . |
| 4,350,061 | 9/1982 | Isham et al. . |
| 4,364,289 | 12/1982 | Sorensen . |
| 4,370,786 | 2/1983 | Butler . |
| 4,403,383 | 9/1983 | Dewhurst et al. . |
| 4,428,114 | 1/1984 | Teagno . |
| 4,446,615 | 5/1984 | Talley . |
| 4,493,233 | 1/1985 | Dusel et al. . |
| 4,502,586 | 3/1985 | Dusel et al. . |
| 4,521,946 | 6/1985 | Dusel et al. . |
| 4,543,717 | 10/1985 | Luka . |
| 4,581,796 | 4/1986 | Fukuda et al. . |
| 4,584,912 | 4/1986 | Gudmestad et al. . |
| 4,597,179 | 7/1986 | Goforth . |
| 4,601,093 | 7/1986 | Cope . |
| 4,631,822 | 12/1986 | Reinertz . |
| 4,638,558 | 1/1987 | Eaton . |
| 4,738,019 | 4/1988 | Kawaguchi . |
| 4,745,828 | 5/1988 | Stepan . |
| 4,802,512 | 2/1989 | Kodera . |
| 4,827,592 | 5/1989 | Kodera . |
| 4,833,778 | 5/1989 | Loustau . |
| 4,838,129 | 6/1989 | Cope . |
| 4,852,433 | 8/1989 | Butler ................................. 81/9.51 |
| 4,869,135 | 9/1989 | Hoffa . |
| 4,932,110 | 6/1990 | Tanaka . |
| 5,016,347 | 5/1991 | Ikazaki et al. . |
| 5,067,379 | 11/1991 | Butler et al. ........................ 81/9.51 |
| 5,146,673 | 9/1992 | Hoffa . |

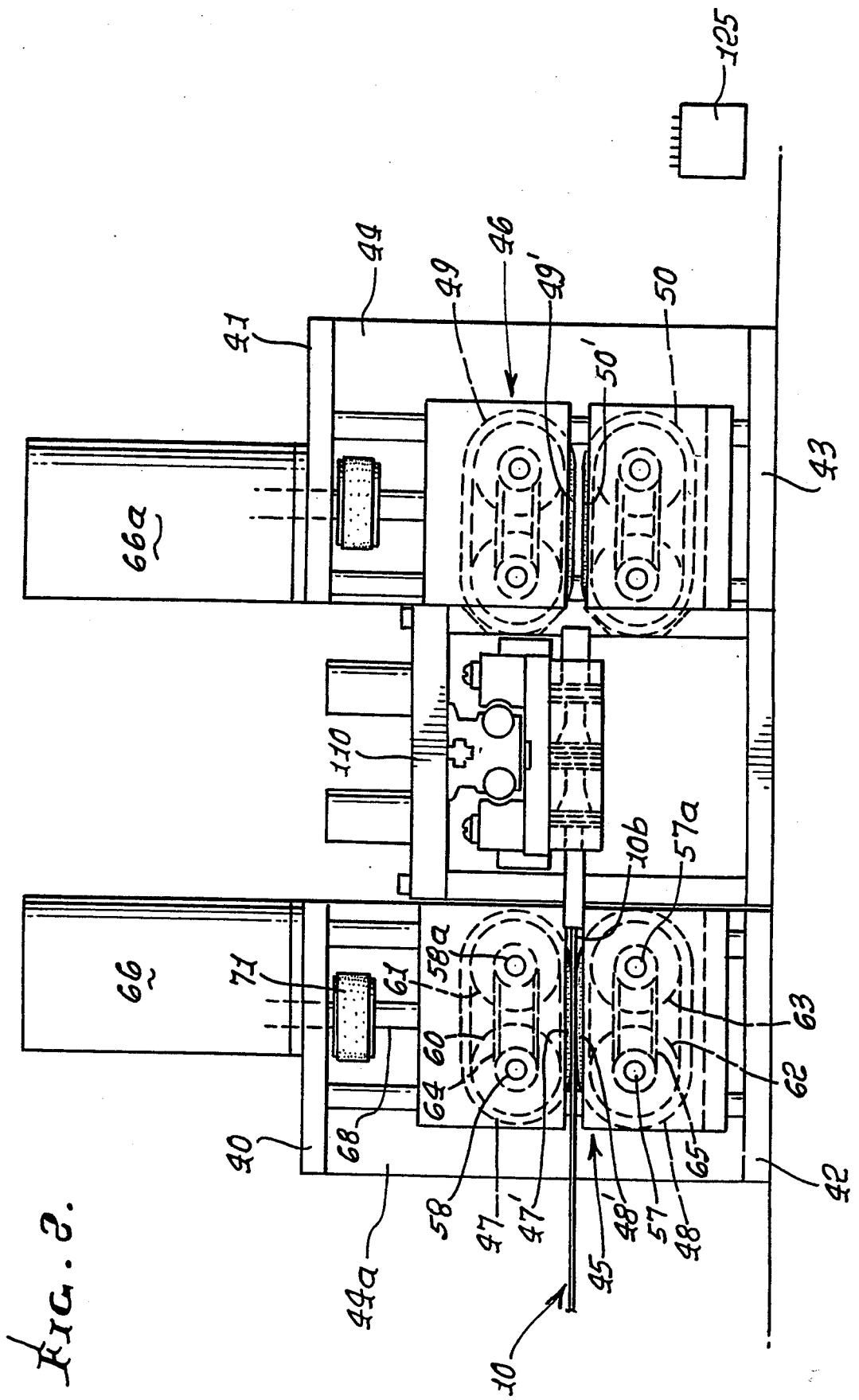

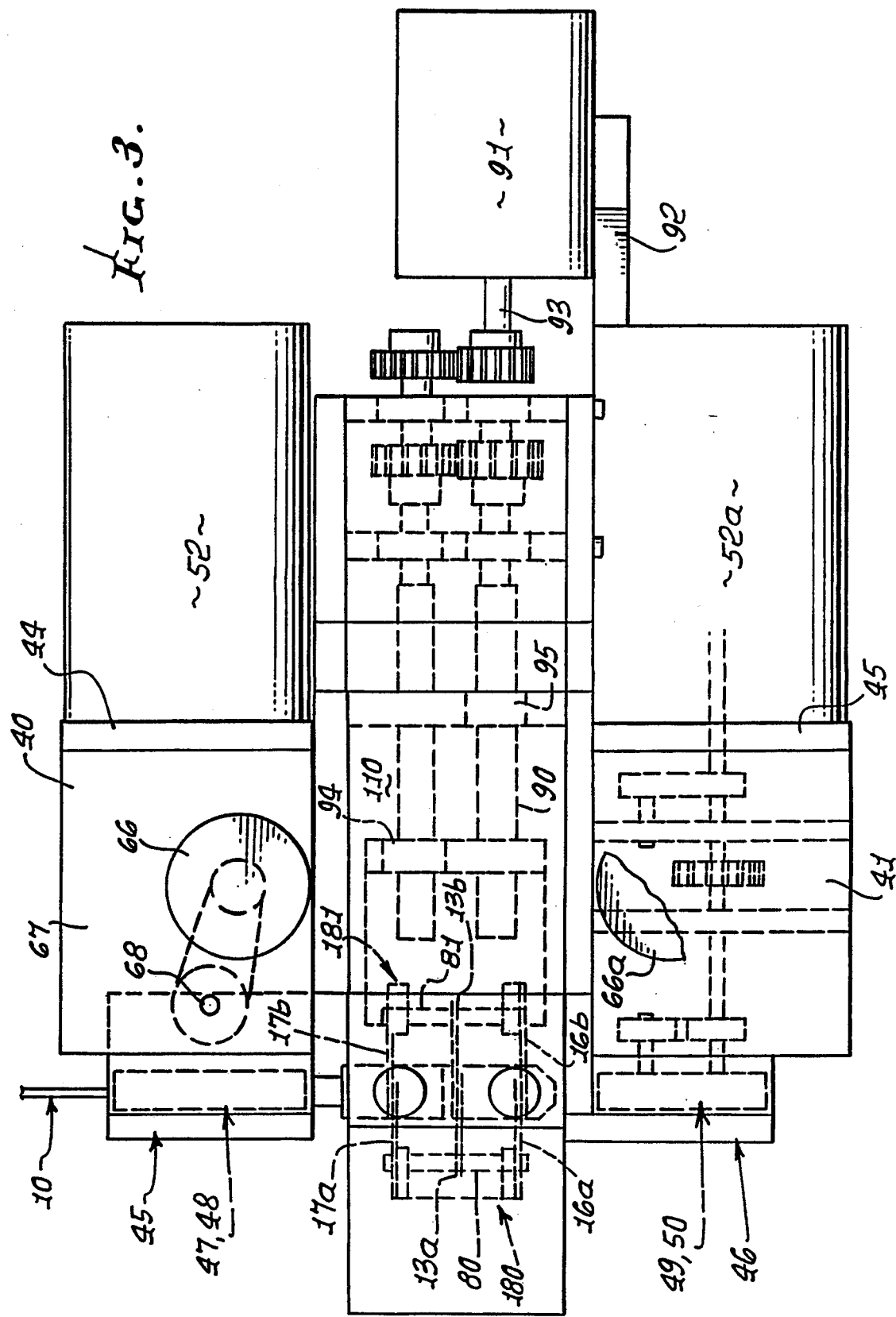

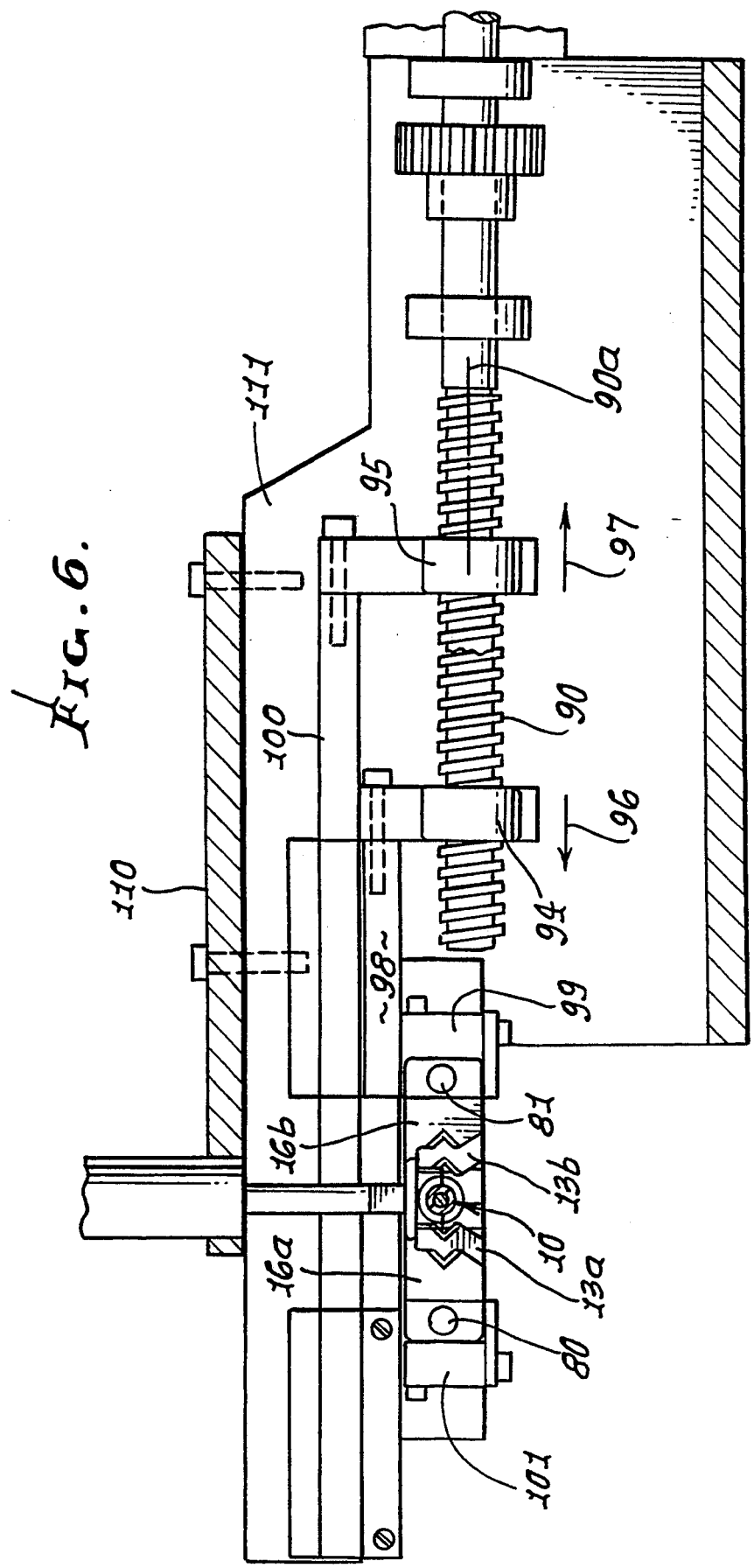

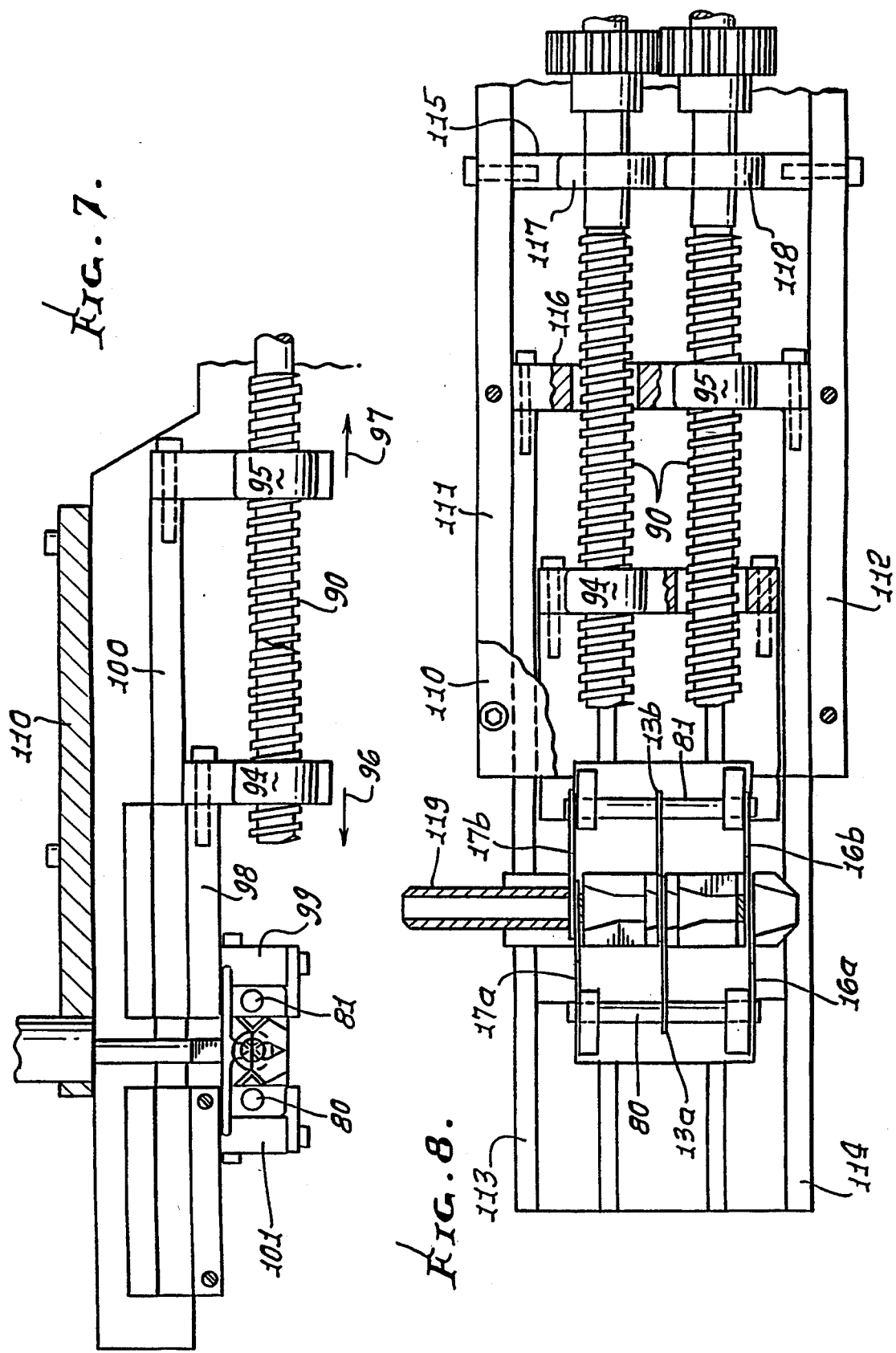

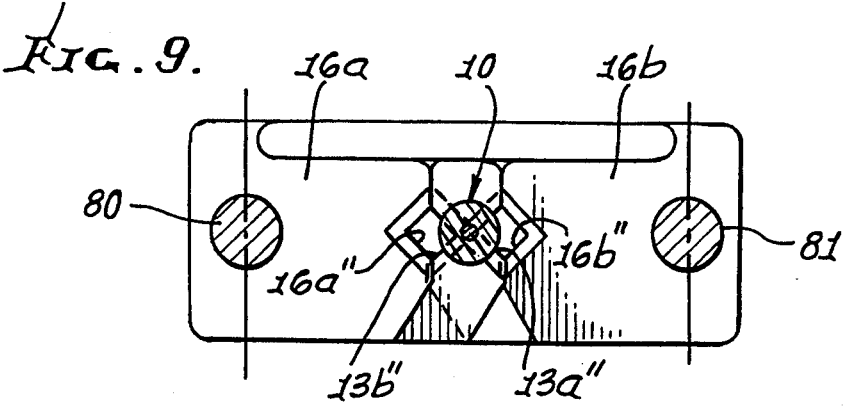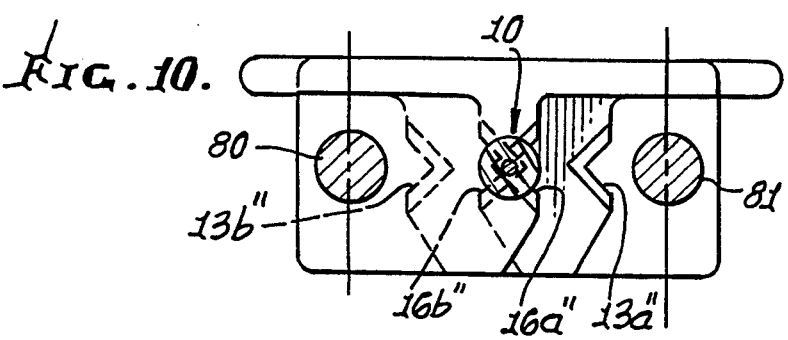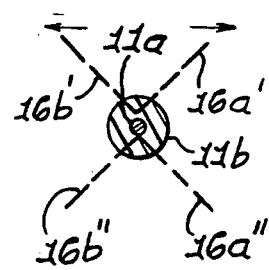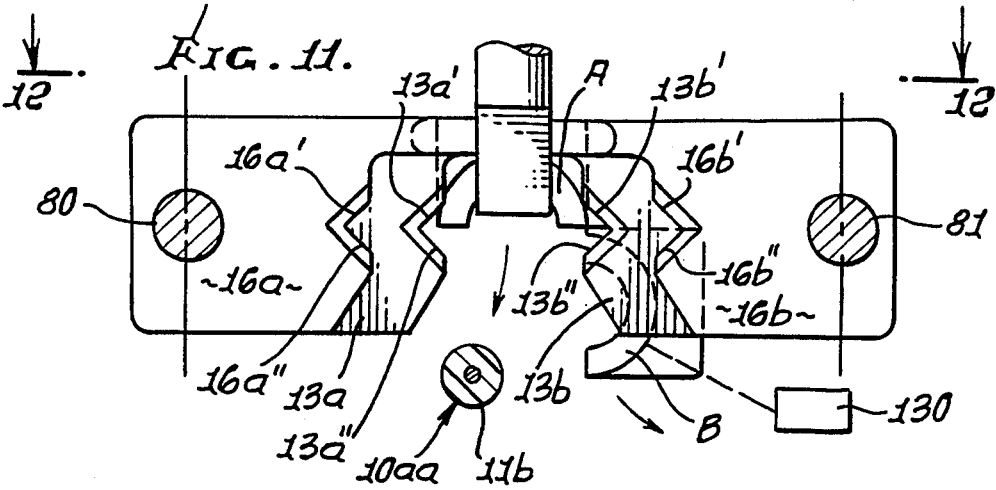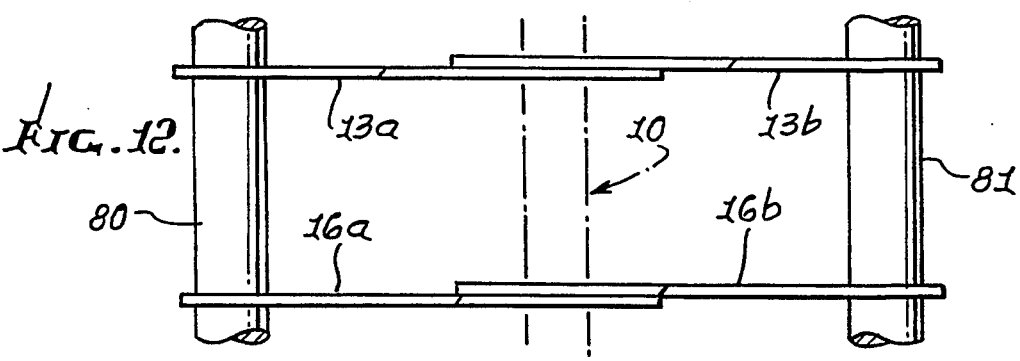

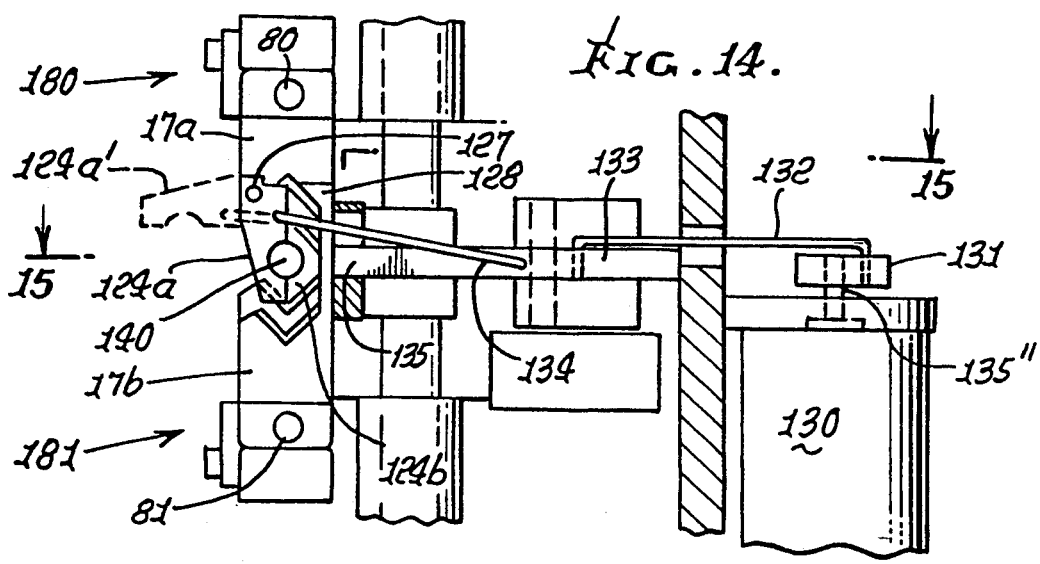
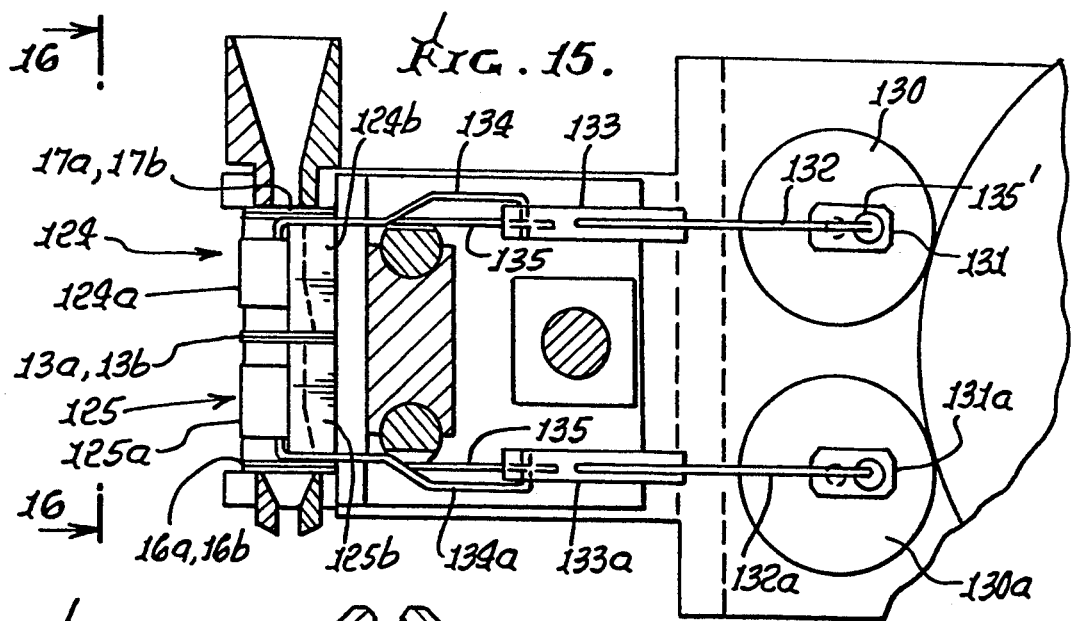
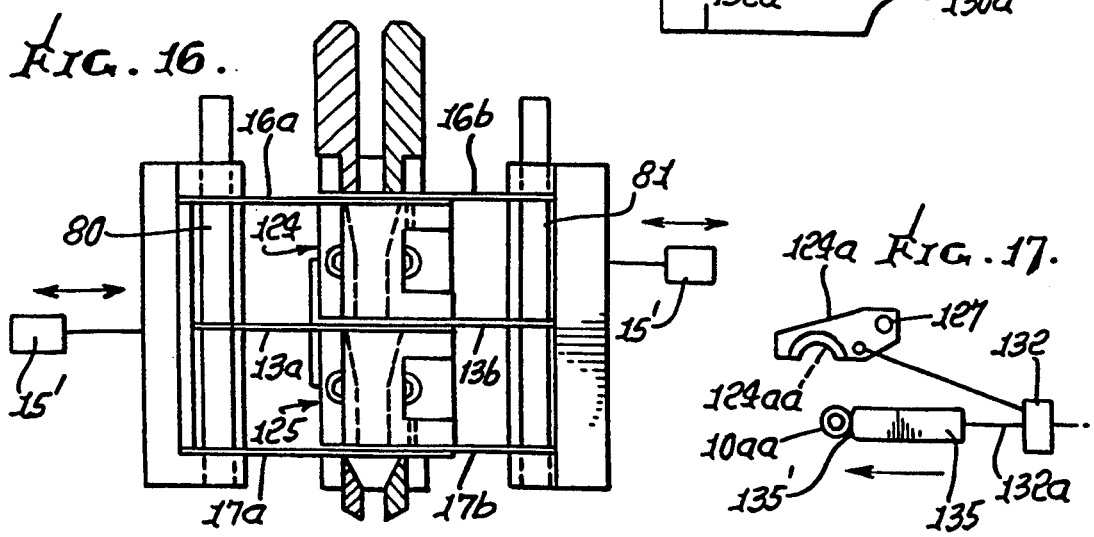

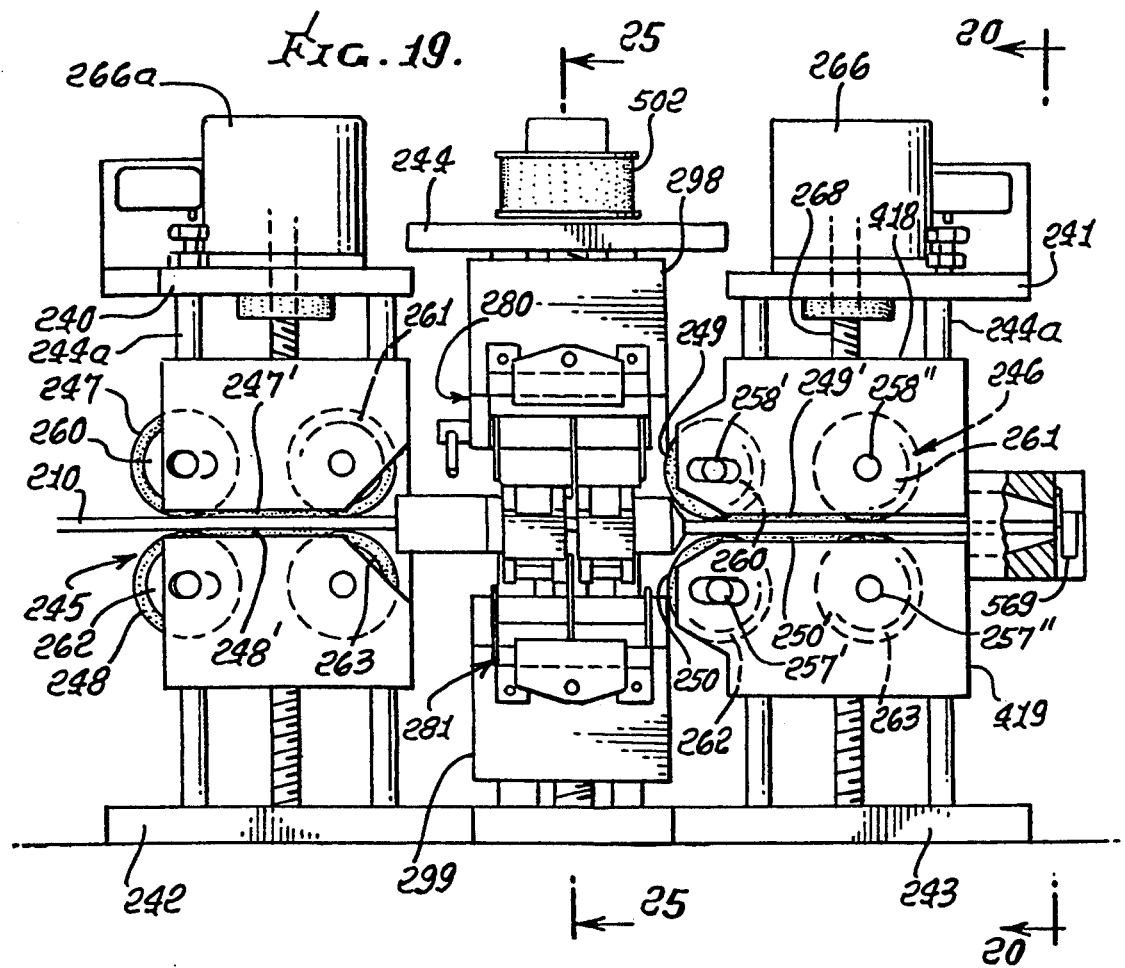
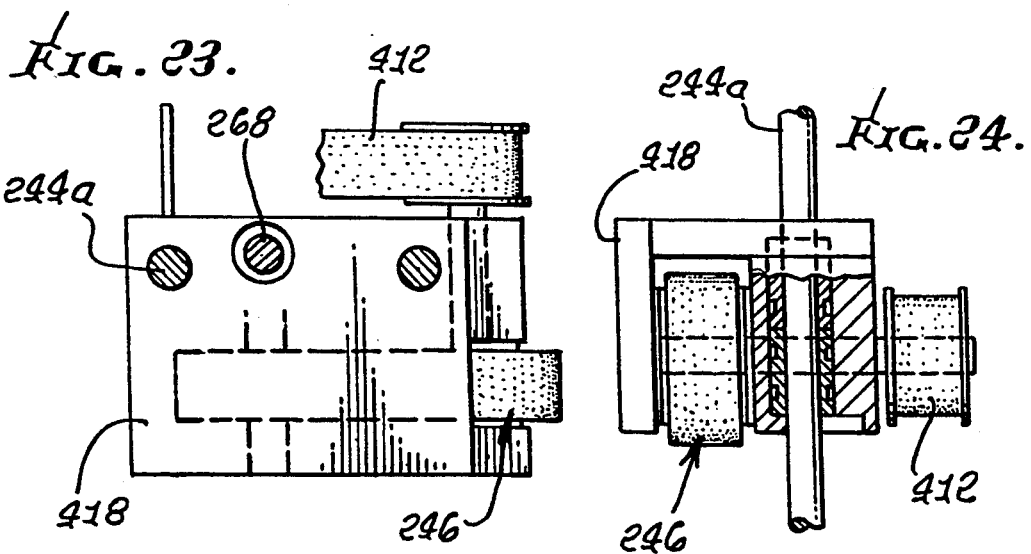

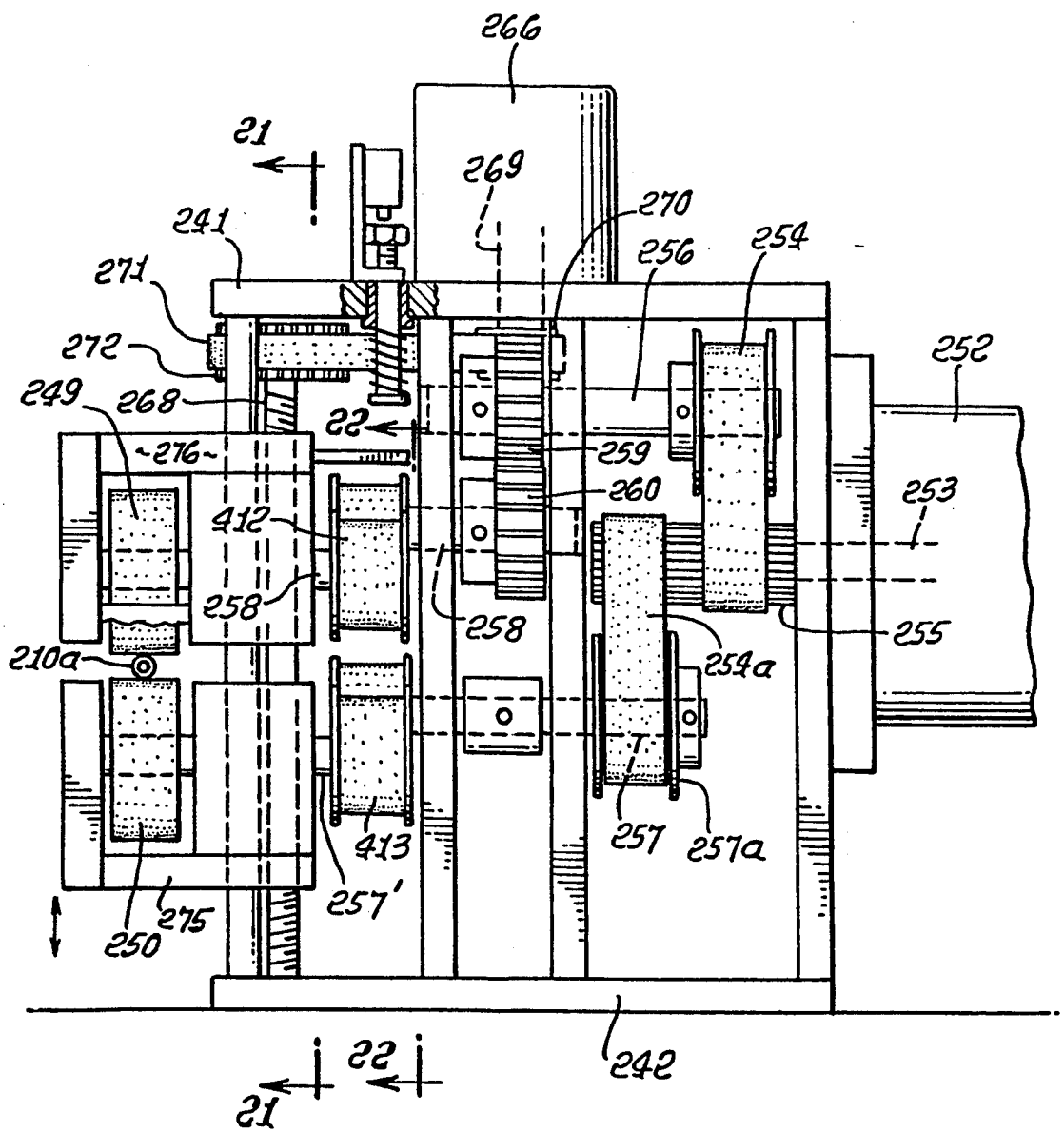

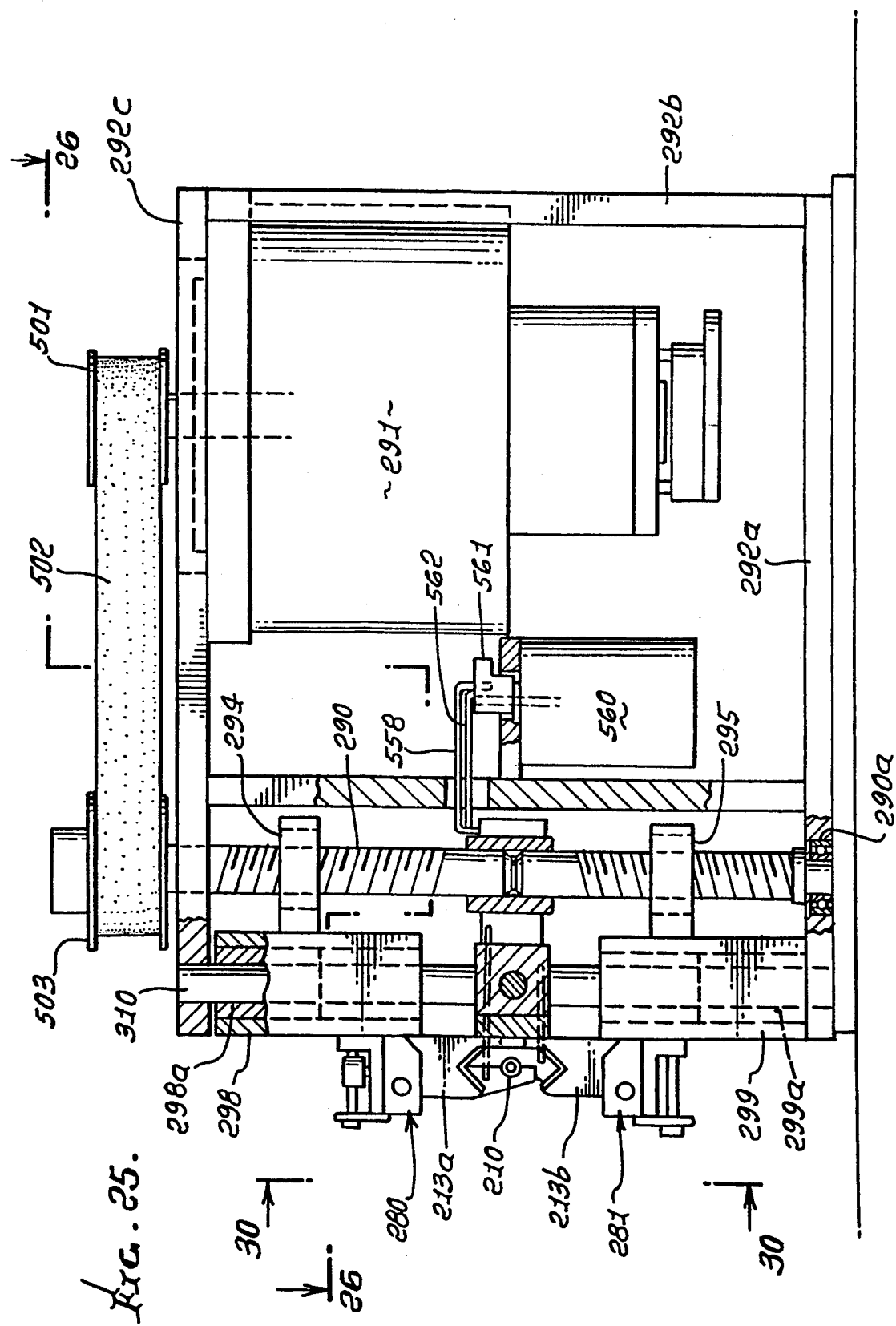

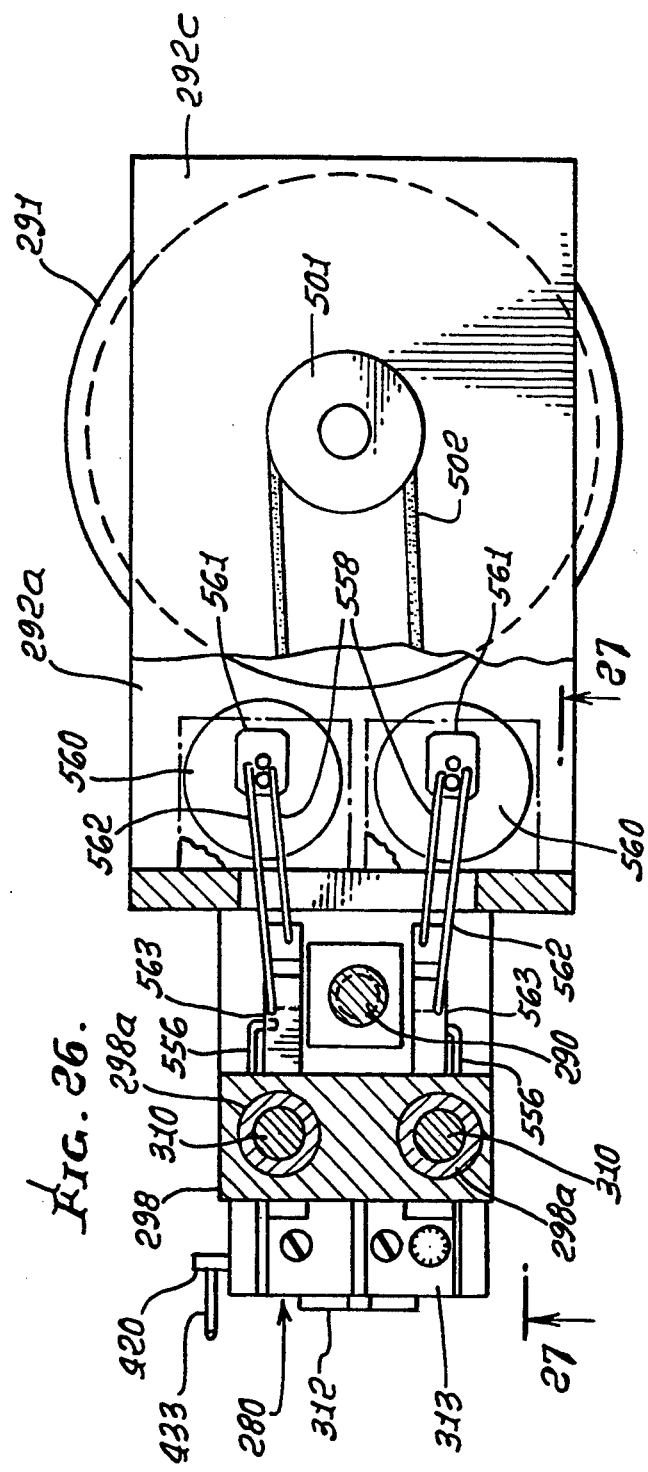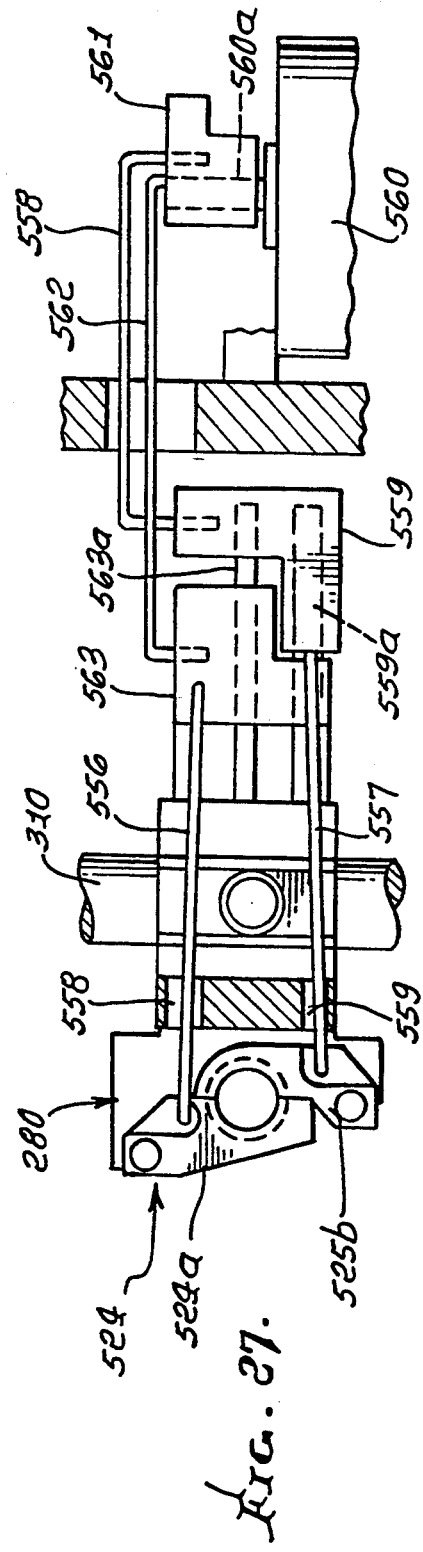

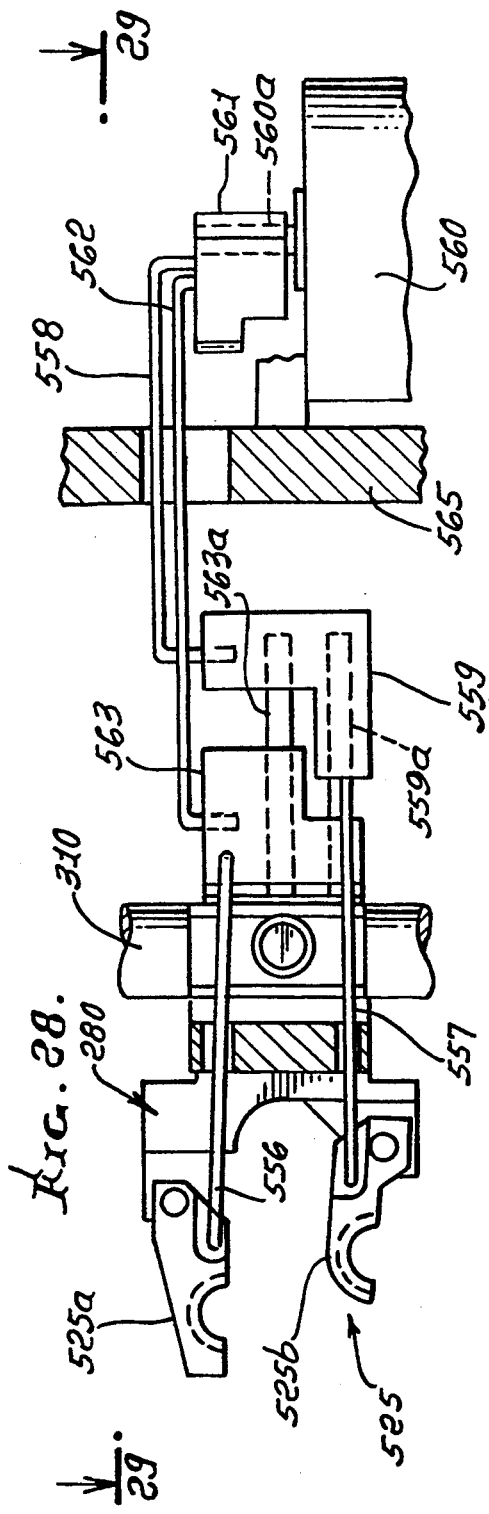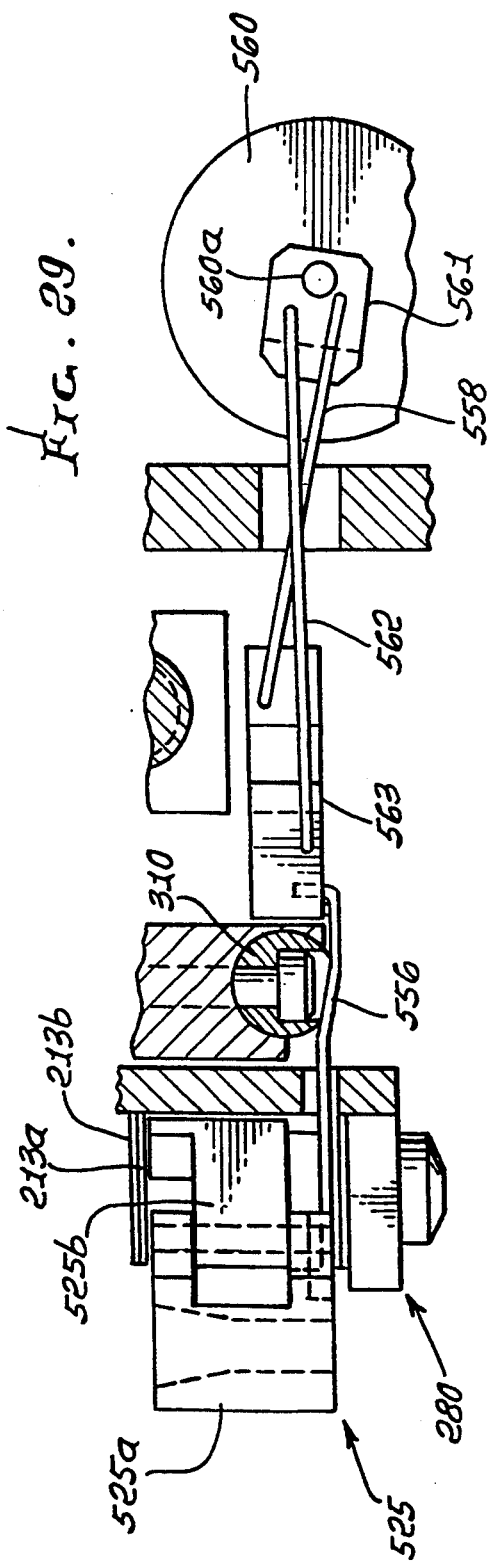

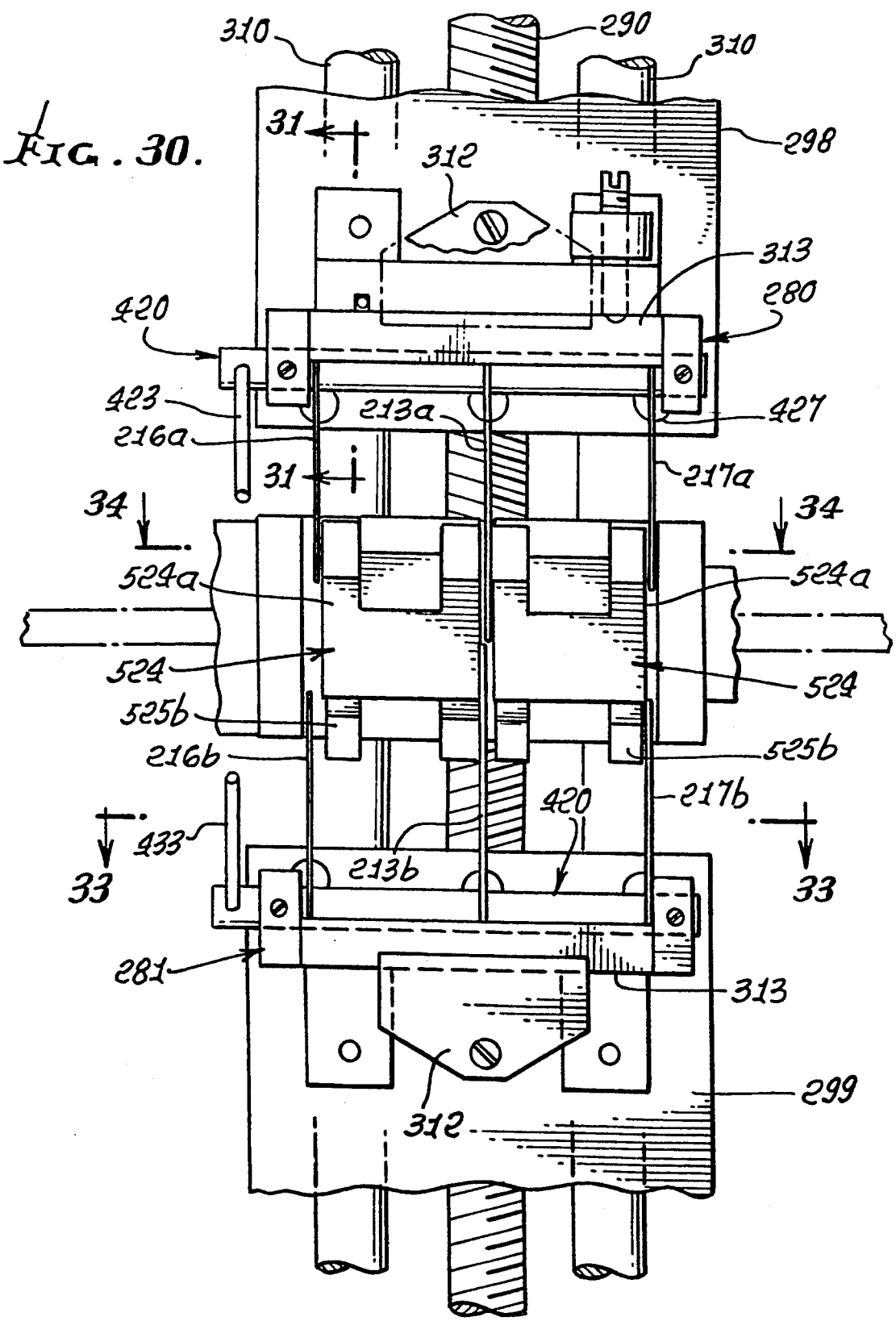

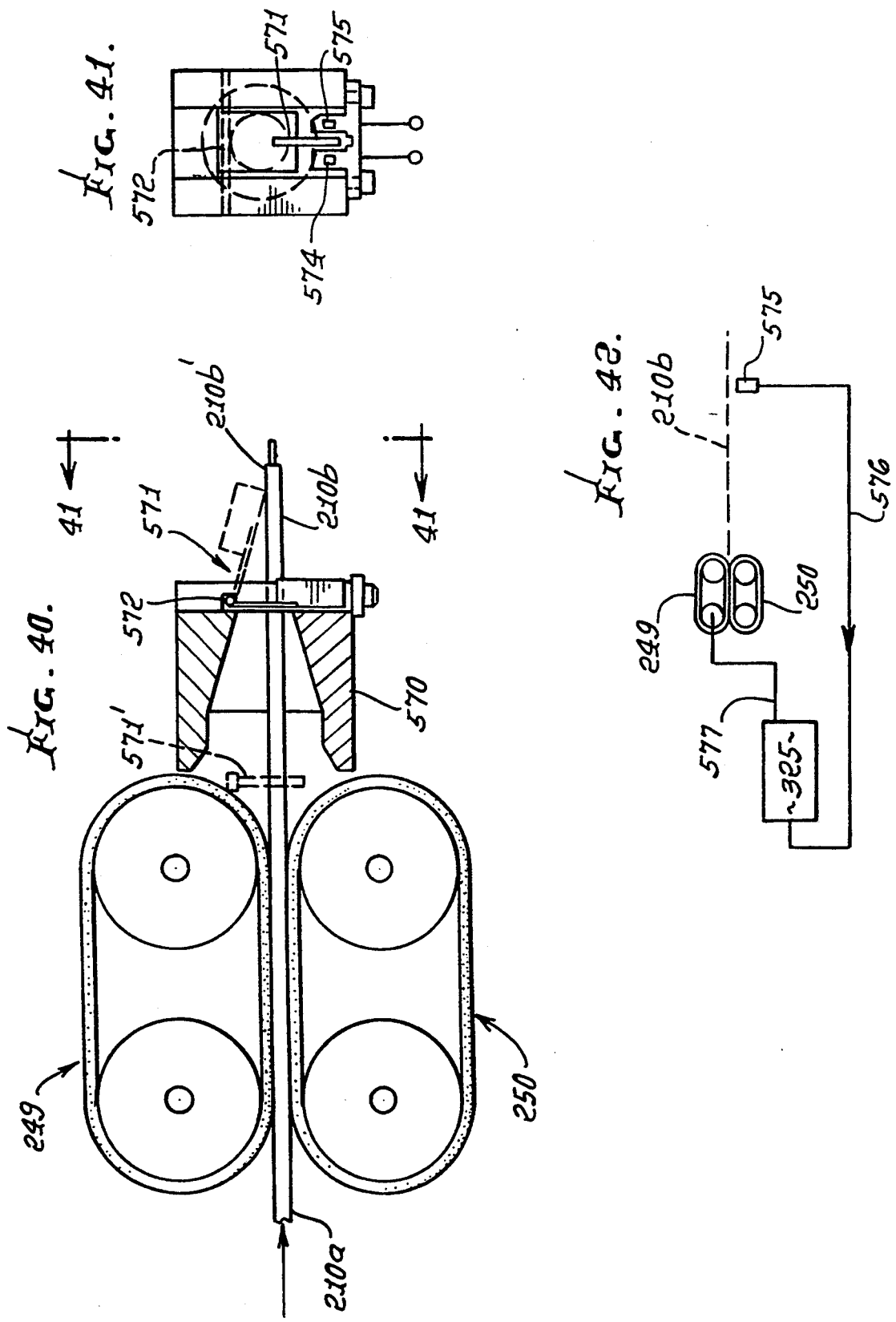

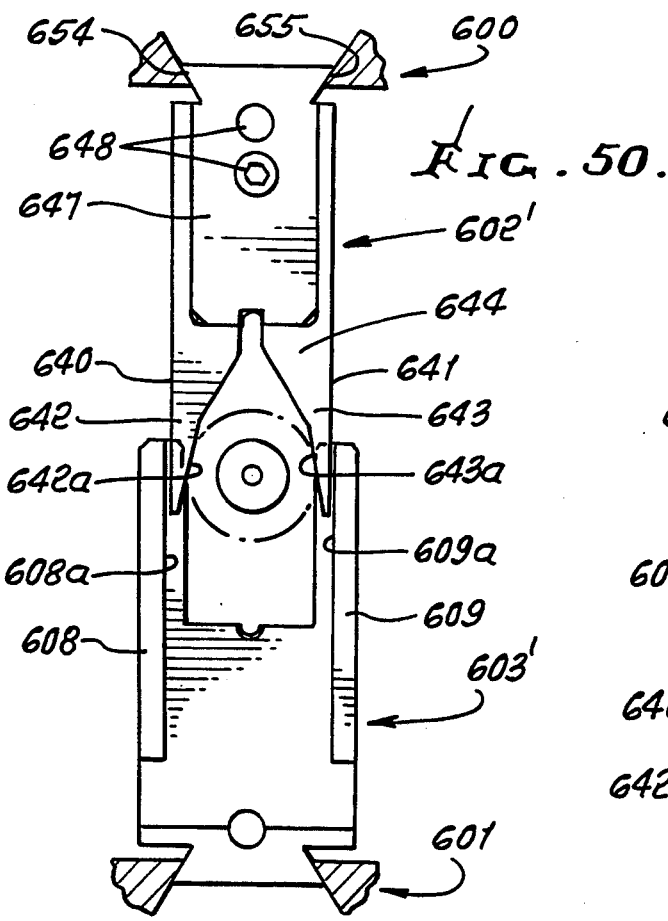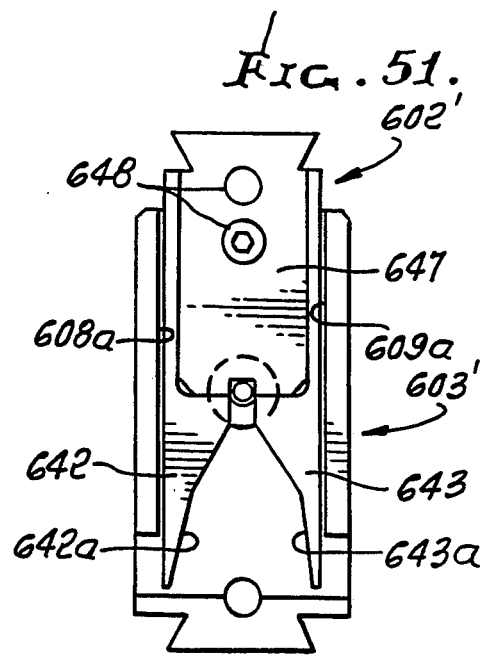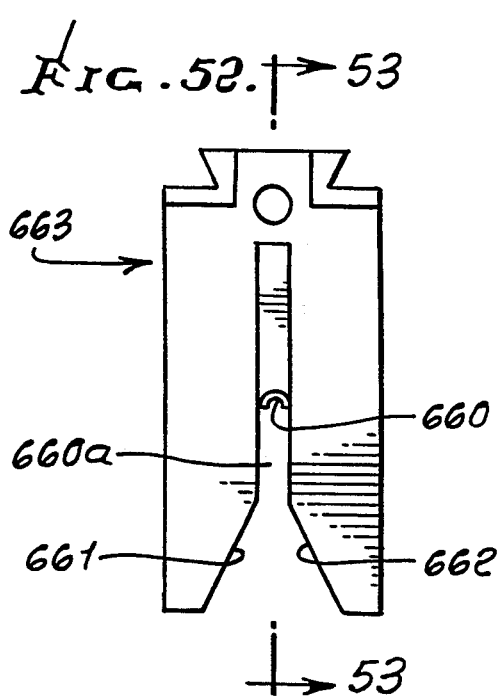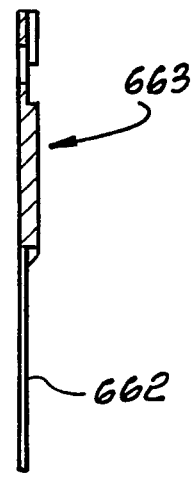

WIRE AND CABLE CUTTING AND STRIPPING USING SLIDABLE INTERFITTING BLADES WITH COMPLEMENTARY CONFIGURATIONS

BACKGROUND OF THE INVENTION

This application is a continuation-in-part of Ser. No. 857,972 filed Mar. 26, 1992, now U.S. Pat. No. 5,293,683, issued Mar. 15, 1989, which is a continuation-in-part of Ser. No. 659,557 filed Feb. 22, 1991, which is a continuation-in-part of Ser. No. 611,057 filed Nov. 9, 1990, now U.S. Pat. No. 5,146,673 issued Sep. 15, 1992.

This invention relates generally to wire or cable severing, as well as stripping sheathing from severed wire sections; and more particularly, it concerns unusual advantages, method and apparatus to effect severing of a wire or cable into two sections, and stripping of sheathing off ends of both sections, with minimal motions of severing and stripping elements and in minimum time.

There is continual need for equipment capable of severing wire or cable into sections, and also capable of rapidly and efficiently stripping sheathing off ends of those sections. It is desirable that these functions be carried out as a wire or cable travels along generally the same axis, i.e., progresses forwardly, and that multiple wire and cable sections of selected length be produced, each having its opposite ends stripped of sheathing, to expose bare metal core wire at each end. Further, it is desirable that simple, radial and axial stripping adjustments be achieved upon multiple wire sections.

SUMMARY OF THE INVENTION

It is a major object of the invention to provide apparatus and method meeting the above need. The word "wire" will be used to include cable within its scope, and vice versa.

Basically, the apparatus of the invention comprises improved blade structures usable in apparatus for processing wire to cut the wire into sections and to expose section wire ends, the wire having an inner core and sheathing about that core, the apparatus including means for displacing the wire axially endwise; in this environment the invention comprises the combination:

a) multiple blade structures, including at least two of which mutually interfit as the two structures move relatively oppositely toward and away from the wire axis, in directions generally normal to that axis, b) at least one of the two structures defining first shoulders elongated in the directions and forming a space between which the other of the two structures extends during the relative movement, the cutting edge associated with the one structure located between the first shoulders, c) each of the two structures having an associated concave cutting edge, the cutting edge associated with the one structure located between the first shoulders, d) each of the two concave cutting edges having a radius such that, when the two structures are moved relatively toward each other to a certain position, the two concave cutting edges cut through the wire sheathing to form an approximate circle that has a diameter approximately equal to the diameter of the inner core of the wire, e) and wherein the first shoulders are laterally spaced apart and face one another, the other of the two structures having second shoulders also elongated in the directions and extending in proximity with the first shoulders during the relative movement, the second shoulders respectively guiding along the first shoulders.

In this regard, the blade structures typically may include two or three blade structure pairs, the blade structures of each pair located at opposite sides of the wire axis, both blade structures of each pair being displaced toward the wire, for example to sever the wire or to strip sheathing from the wire.

It is another object to provide programmable means associated with the apparatus to provide programmable strip length of the sheathing.

An additional object is to provide the other blade structure, as referred, to include a blade and a blade holder carrying the blade, the holder forming the second shoulders. Riveting may be used to attach the blade guide or holder to the blade. Also, the first and second shoulders, as referred to, may extend in endwise alignment with one another, or may extend in laterally overlapping relation, as will be seen.

Yet another object is to provide blade structures that employ blade plates having wire cutting edges, the blade plates extending in close, parallel, overlapping relation during their relative movement. Typically, the cutting edges on two of the overlapping plates include C-shaped edge portions forming an approximate circle when the blade plates have maximum overlap during their relative movement, the first shoulders then positioned at opposite sides of the approximate circle.

A further object is to provide support means for the blade structures for holding the blade structures attached in fixed positions on the support means, the blade structures having angled shoulders engageable with the support means. Retainers may be associated with the support means for holding the blade structures attached in fixed positions on the support means, there being manipulable means on the retainer means to effect retraction of the retainer means, thereby to allow release of the blade structures from the support means, enabling their selective replacement. In this regard, the blade structures may have primary angled shoulders engageable with the support means, and secondary angled shoulders engageable by the retainer means upon rotary advancement thereof.

Another object is to provide a first set of multiple of such blade structures at one side of the axis and a second set of multiple of the blade structures at the opposite side of the axis, the retainer means including a first retainer carried by the support means at one side of the axis for rotary advancement to hold the multiple blade structures of the first set in the fixed position, and for rotary retraction to allow release of the blade structures of the first set. Additionally, a second retainer may be carried by the support means at the opposite side of the axis for rotary advancement to hold the multiple blade structures of the second set in the fixed position and for rotary retraction to allow release of the multiple blade structures of the second set.

Finally, the guiding edges of one of the blades may taper away from the axis and terminate at a bridging C-shaped cutting edge portion; and guide edges of the other of the blades may extend diametrically oppositely from a bridging C-shaped cutting edge portion.

These and other objects and advantages of the invention, as well as the details of an illustrative embodiment, will be more fully understood from the following specification and drawings, in which:

DRAWING DESCRIPTION

FIG. 2 is a side view elevation showing wire displacing and processing apparatus;

FIG. 3 is a top plan view showing the apparatus of FIG. 2;

FIG. 6 is an enlarged cross-section taken in elevation to show sheathing stripping actuator structure;

FIG. 7 is a view like FIG. 6 but showing the blades in advanced positions;

FIG. 8 is a plan view of the FIG. 6 and FIG. 7 mechanism;

FIG. 9 is an end view showing wire severing blades in wire severing position, as in FIG. 1b;

FIG. 10 is an end view like FIG. 9 showing the sheathing stripping blades, in sheathing stripping position, as per FIG. 1d;

FIG. 10a is a view showing stripping blade edge penetration into wire sheathing;

FIG. 11 is a view like FIGS. 9 and 10, but showing all blades in retracted position, as in FIGS. 1a and 1f;

FIG. 12 is an end view taken on lines 12—12 of FIG. 11;

FIG. 14 is a side elevation showing cut insulation slug release and ejection means;

FIG. 15 is a plan view on lines 15—15 of FIG. 14;

FIG. 16 is an end elevation taken on lines 16—16 of FIG. 15;

FIG. 17 is a schematic showing of slug pusher operation;

FIG. 19 is a side elevational view like that of FIG. 2 showing wire conveying and processing apparatus;

FIG. 20 is an end view taken on lines 20—20 of FIG. 19;

FIG. 23 is a section taken on lines 23—23 of FIG. 21;

FIG. 24 is a section taken on lines 24—24 of FIG. 21;

FIG. 25 is a vertical section taken on lines 25—25 of FIG. 19;

FIG. 26 is a plan view, partly in section, taken on lines 26—26 of FIG. 25;

FIG. 27 is an elevation taken on lines 27—27 of FIG. 26;

FIG. 28 is an enlarged plan view, like that of FIG. 26, showing wire slug trap door and pusher elements in outwardly pivoted states;

FIG. 29 is an elevation taken on lines 29—29 of FIG. 28;

FIG. 30 is an enlarged frontal elevation taken on lines 30—30 of FIG. 25;

FIG. 36 is a section taken on lines 36—36 of FIG. 35a;

FIG. 40 is a side elevational view of a wire advancement detection means;

FIG. 41 is an end view taken on lines 41—41 of FIG. 40;

FIG. 42 is a circuit diagram;

FIG. 46b is a section taken on lines 46b—46b of FIG. 46a;

FIG. 50 is a view like FIG. 45 showing a modification;

FIG. 51 is a view like FIG. 46 but depicting the modified blade structures of FIG. 50 in closed together condition;

FIG. 52 is an elevation showing a further modified blade structure; and

FIG. 53 is an edge view section taken on lines 53—53 of FIG. 52.

DETAILED DESCRIPTION

Figure 1A:
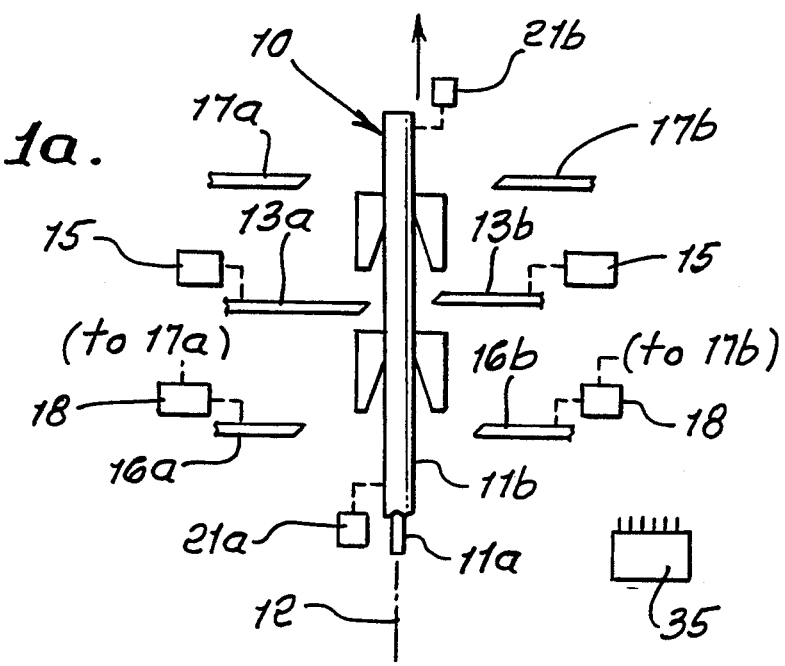
FIGS. 1a-1f are diagrammatic views showing steps in the method of wire or cable processing.

Referring first to FIGS. 1a-1f, they show in diagrammatic form the positions of both wire severing and sheathing stripping blades, during various steps in the wire processing procedure or method. In this regard, the "wire" 10 (meant to also refer to cable) has a metal core 11a and a tubular sheathing 11b about the core. The wire is shown extending axially longitudinally in FIGS. 1a-1f, the axis being located at 12.

First cutter means is provided to include, or may be considered to include, multiple blades. See for example the two wire-cutting blades 13a and 13b of a first set, located or carried for movement laterally toward and away from the wire axis 12. A first drive for controllably simultaneously enabling or advancing the blades toward one another, laterally oppositely (see arrows 14a and 14b in FIG. 1b), is shown at 15. That drive is also operable to retract the blades 13a and 13b away from one another.

Second and third cutter means are also provided, for sheathing stripping, and each may be considered to include multiple blades located for movement toward and away from the axis 12. See for example the second set of two blades 16a and 16b, and the third set of two blades 17a and 17b.

Blades 16a and 16b are located or considered to be controllably simultaneously displaced, as by drive 18, laterally oppositely, toward one another (see arrows 19a and 19b in FIG. 1d), the drive also operable to retract the blades 16a and 16b away from one another. Similarly, the blades 17a and 17b are located or carried to be controllably displaced, simultaneously, laterally oppositely toward one another (see arrows 20a and 20b in FIG. 1d), and drive 18 may be used for this purpose. Thus, blades 16a and 16b may be displaced toward one another at the same time and to the same extent as blades 17a and 17b are displaced toward another, as is clear from FIG. 1d. The latter shows that the blades 16a and 16b, and 17a and 17b, do not sever the wire but may closely approach the wire while cutting into sheathing 11 for stripping purposes.

Brief reference to FIGS. 9-11 show the blades 16a and 16b to have V-shape, as do wire severing blades 13a and 13b, and blades 17a and 17b. Note edges 16a' and 16a" and 16b' and 16b" (of blades 16a and 16b) cutting into the sheathing in FIG. 10a to approach the wire core from four sides for efficient stripping, while leaving the core uncut. Similar functioning of blade edges 17a' and 17a", and 17b' and 17b" also takes place, as in FIG. 1d.

Figure 1B:
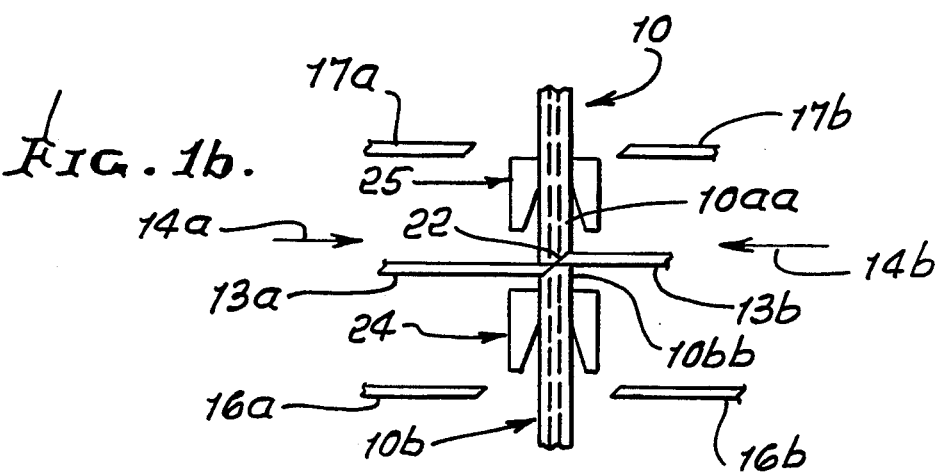

FIG. 1a shows displacement of the wire axially endwise and longitudinally, as by a conveyor means 21a to the first position as shown. FIG. 1b shows the step of severing the wire thereby to form wire forward and rearward sections 10a and 10b, the blades 13a and 13b being advanced laterally to accomplish complete severing at locus 22, as shown. Note that wire forward section 10a has a rearward end portion 10aa; and the wire rearward section 10b has a forward end portion 10bb.

Figure 1C:
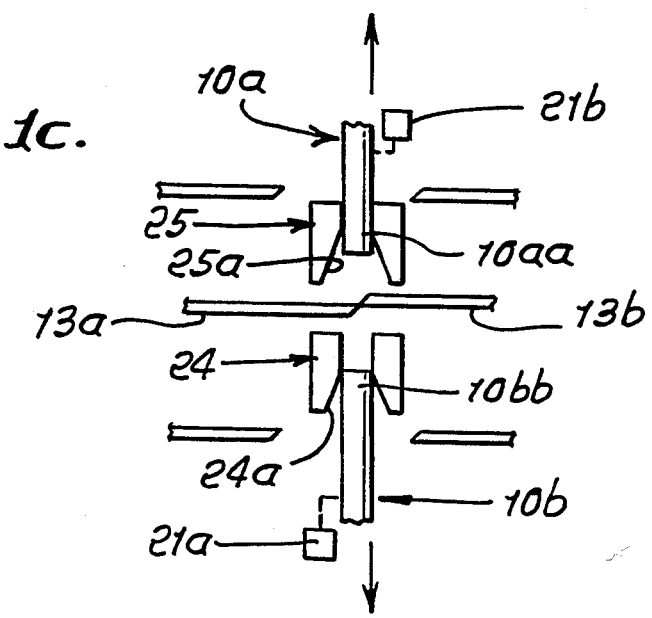

FIG. 1c shows the step of controllably separating the two sections 10a and 10b axially endwise oppositely, as to the positions shown, in which the end portions 10aa and 10bb are spaced from the closed-together blades 13a and 13b. Guides 24 and 25, provided between the blade sets, serve to accurately guide the wire and the sections 10a and 10b during the cutting and severing operation, as is clear from FIGS. 1a-1f. Note the tapered entrances 24a and 25a to the guides to receive and center the forwardly advanced wire.

Wire drives 21a and 21b are controllably operated to engage and separate the two sections 10a and 10b, as indicated in FIGS. 1a and 1c.

Figure 1D:
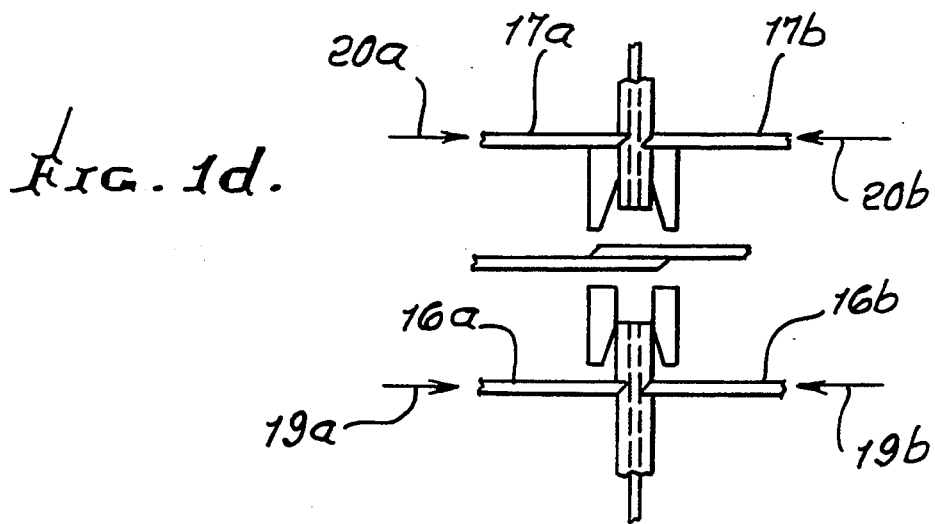

FIG. 1d shows a sub-step included within the step of stripping sheathing from the forward section rearward portion and from the rearward section forward portion thereby to expose wire ends at the portions. Note that blades 16a and 16b are simultaneously advanced laterally oppositely, as to blade edge positions described above, as respects FIG. 10a, and as blades 17a and 17b are also simultaneously advanced laterally oppositely (as to the same extent if such stripping is to be equal for each wire section). Note that blades 13a and 13b now extend in laterally overlapping condition due to operation of drives 15 and 18 as one, i.e., equal rightward lateral displacement for blades 13a, 16a and 17a, and equal leftward lateral displacement for blades 13b, 16b and 17b; however, they may be separately driven so as not to extend in such relation, as shown. Blades 13a, 16a and 17a may be connected together to move rightwardly to equal extent; and blades 13b, 16b and 17b may also be connected together to move leftwardly as one, for extreme simplicity.

Figure 1E:
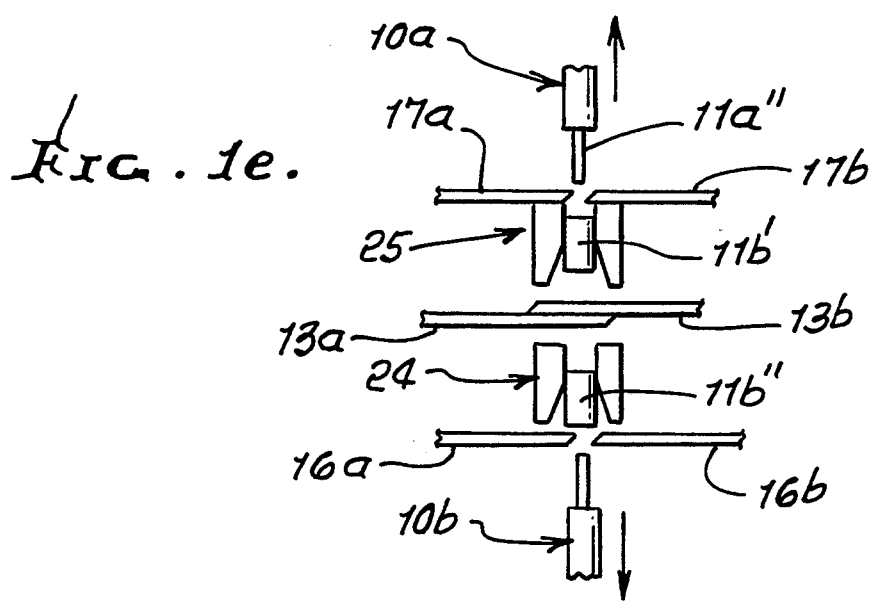

FIG. 1e shows operation of the wire drives to further endwise separate the wire sections 10a and 10b so as to pull or strip two sheathing end portions 11b' and 11b" from the wire sections 10a and 10b, thereby to expose the wire core end portions 11a' and 11a". The stripped sheathing end portions 11b' and 11b", or slugs, are allowed to drop out from between the pairs of guides 24 and 25 which may be split, as shown, to provide slug drop-out openings, and may be movable to facilitate such drop out.

Figure 1F:
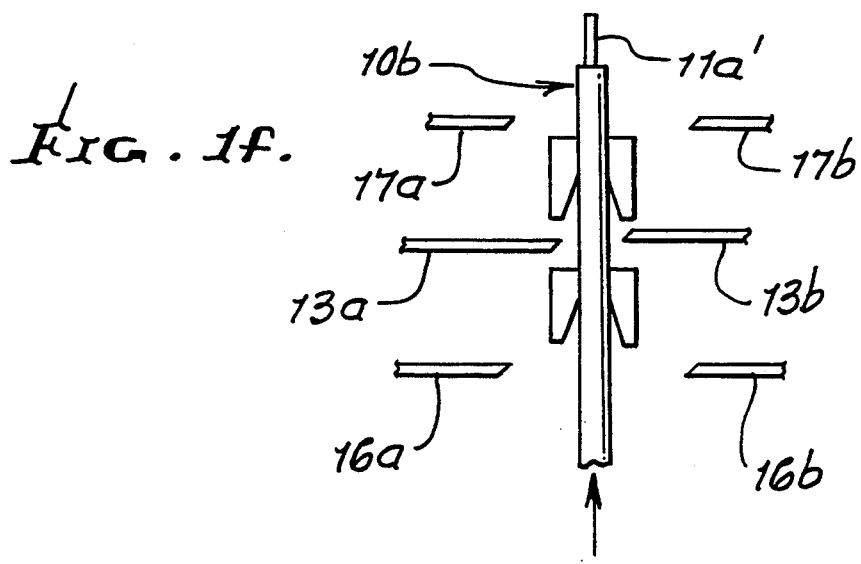

FIG. 1f shows all blades laterally retracted and the wire rearward section 10b fully advanced into position corresponding to FIG. 1a position for controlled length endwise positioning to be processed, as in FIGS. 1b-1e to provide an exposed core end at its opposite end. Thus, controlled length wires (or cables), with exposed core lengths at each end of each wire, is efficiently and rapidly and controllably provided. See master control 35 to control all the driving, as described, and to be described.

Referring now to FIGS. 2-8, one form of apparatus to accomplish the above operations (FIGS. 1a-1f) is shown in detail. A frame is provided, as at 40-44 and 44a, to mount two conveyors 45 and 46, which may be considered as included within the wire drives 30 and 31, as mentioned. Such conveyors may include two rearwardly positioned endless belts 47 and 48, and two forwardly positioned endless belts 49 and 50. The belts provide stretches, as at 47' and 48', which are adapted to sidewise flatly grip the wire 10 (and specifically the wire rearward section 10b) for endwise advancement and retraction, as during separation of the sections 10a and 10b in FIG. 1c; and stretches 49' and 50' are adapted to sidewise grip the wire 10 (and specifically the wire forward section 10a) for endwise advancement and retraction.

Figure 4:
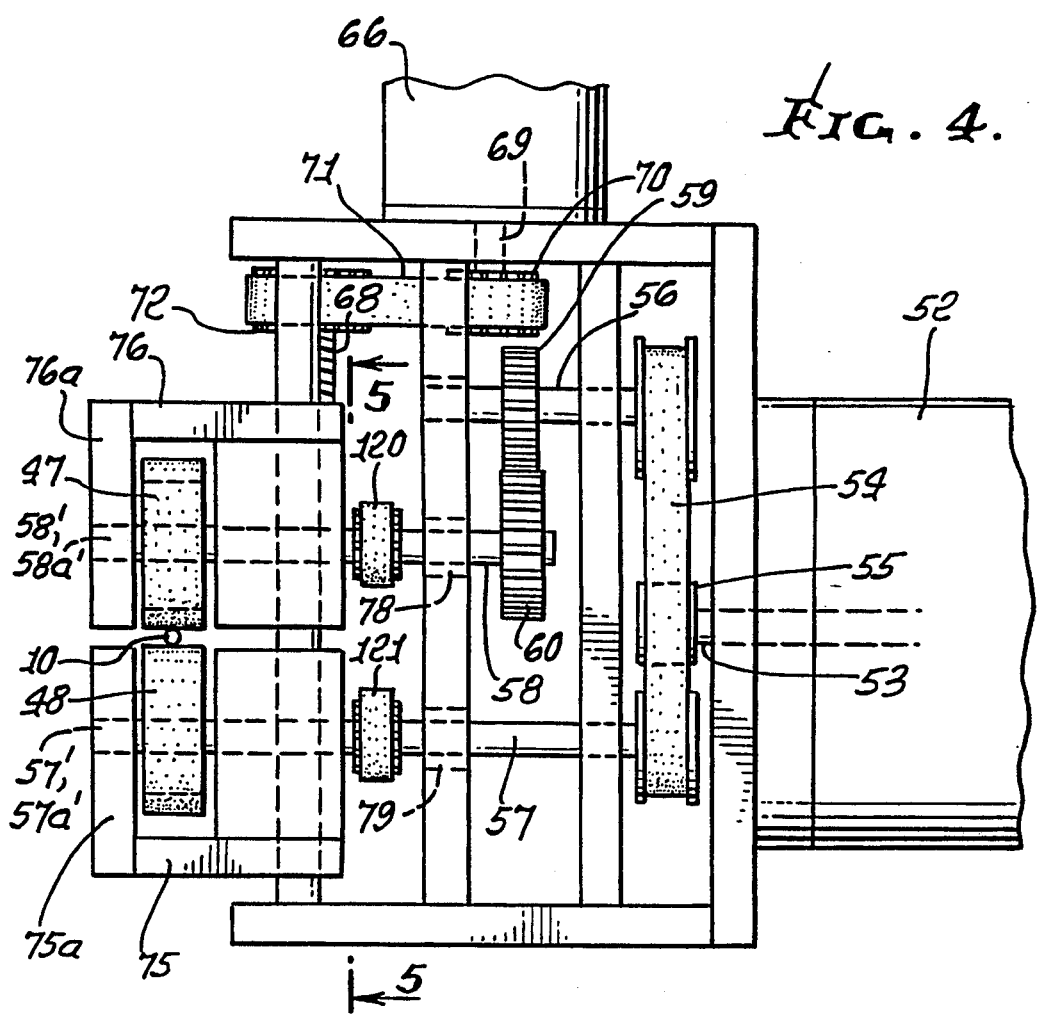
FIG. 4 is an end view, taken in elevation, showing wire belt displacing drive apparatus.

The belts 47 and 48 are driven to advance or retract the wire section 10a as from a drive motor 52 (see FIG. 4). The output shaft 53 of the motor drives belt 54, as via a pulley 55, and belt 54 drives shafts 56 and 57. Shaft 56 drives another shaft 58, through gearing 59 and 60, to drive shaft 58 and upper conveyor belt 47 clockwise; whereas lower shaft 57 and lower belt 48 are driven counterclockwise in FIG. 2. This drives the wire forwardly; whereas when motor 52 is reversed, the wire is driven rearwardly. Additional axles or shafts for the conveyor belts 47 and 48 appear at 58a and 57a.

FIG. 2 shows conveyor rotors 60 and 61, and 62 and 63. These carry the belts 47 and 48. Axles 58a and 57a are driven by drive belts 64 and 65 extending between pulleys on the shafts 58 and 58a, and 57 and 57a, as shown. Accordingly, when the belt stretches 47' and 48' are closed against opposite sides of the wire 10, and the motor 52 is operating, the wire is displaced endwise.

Means is provided to move the conveyor belt stretches 47' and 48' toward one another to clutch the wire, and away from one another to de-clutch the wire. See for example in FIGS. 3-5 the motor or drive 66 carried by a frame part 67 to rotate a vertical screw shaft 68, as via motor output shaft 69, pulley 70, belt 71, and pulley 72 on the screw shaft 68. The screw shaft has screw thread engagement at 73 and 74 with frame members 75 and 76. Frame member 76 supports the ends of shafts 58 and 58a, via member extension 76a, as at 58' and 58a'; whereas frame member 75 supports the ends of shafts 57 and 57a, via member extension 75a, as at 57' and 57a'. Screw threading interfit at 74 is oppositely "handed" relative to threading interfit at 73, so that when shaft 68 is rotated in one direction about its axis, the frame members 75 and 76 are displaced toward one another, whereby conveyor stretches 47' and 48' may clamp the wire; and when the shaft 68 is rotated in the opposite direction about its axis, the members 75 and 76 are displaced away from each other, and the wire is de-clutched.

The bearing supports at 78 and 79 for shafts 58 and 57 are made loose enough to accommodate such up/down movement of those shafts at the conveyor belt drive locations. Note also couplings at 110 and 111.

Tension springs 90 and 91 are provided (see FIG. 5) between fixed frame structure 92 and shoulders 76a' on 76a to yieldably urge the structures 76 and 76a, and the belt stretch 47' downwardly; and similarly, tension springs 93 and 94 are provided between fixed frame structure 95 and shoulder 75a' on 75 to yieldably urge the structure 75 and 75a and the belt stretch 48' upwardly. This provides clearance "take-up" for better control of wire gripping or clamping.

Figure 5:
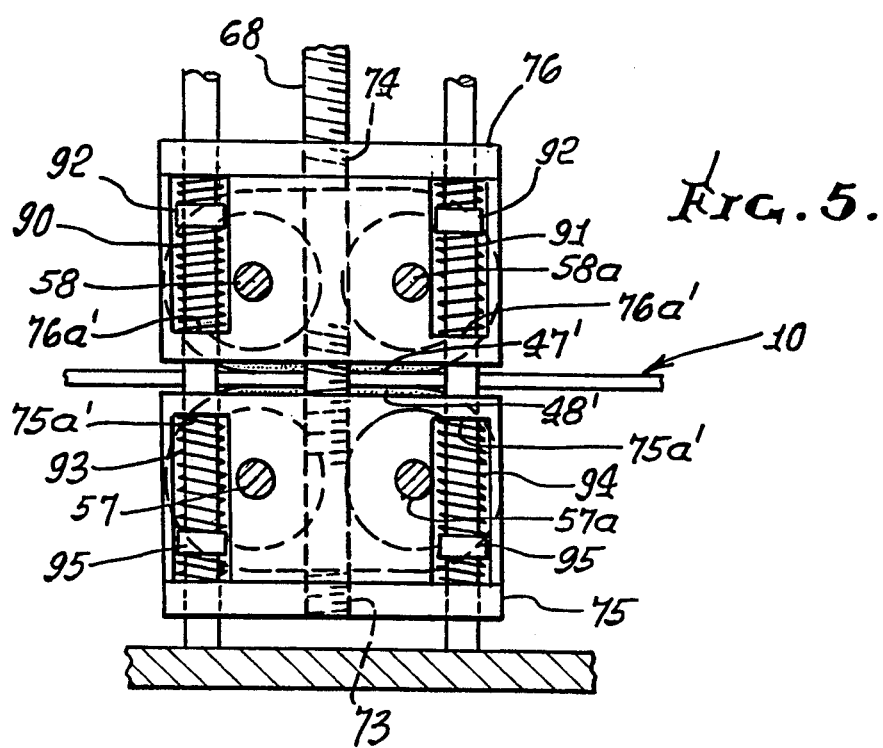
FIG. 5 is an elevation showing spring urging of wire drive belts.

The forward conveyor unit 46 embodies conveyor belt drive and up/down movement the same as described in connection with unit 45 in FIGS. 3–5. The drive motor 52a for driving the belt stretches 49' and 50' forwardly and reversely is seen in FIG. 3, as is the motor 66a to control belt clamping of the forward wire section. Mechanism between the motors 52a and 66a, and the respective forward conveyor belts 49 and 50, is the same as above described mechanism between motors 52 and 66 and the respective rearward conveyor belts 47 and 48; however, the motors 52 and 51a are typically operated simultaneously, either to drive the wire or wire sections forwardly, as in FIGS. 1a and 1f, or to drive the wire sections endwise oppositely, as in FIGS. 1c and 1e. A master control to control all drives, in a pre-programmed manner, is seen at 125.

Referring to FIG. 11, the wire severing blades 13a and 13b are fully laterally retracted, as are the wire sheathing stripping blades 16a and 16b. Blades 17a and 17b are in axial alignment with blades 16a and 16b, and are not shown. Note V-angled blade edges 13a' and 13a'', and blade edges 13b' and 13b''. The blades 13a, 16a and 17a at one side of the wire 10 are interconnected by axially extending carrier rod 80; and the blades 13b, 16b and 17b at the opposite ends of the wire are interconnected by axially extending carrier rod 81, laterally spaced from rod 80. Rods 80 and 81 are relatively movable laterally toward one another to effect wire severing, as by blades 13a and 13b (see FIG. 9 and also FIG. 1b). Rods 80 and 81 are further laterally movable toward one another to effect penetration of the blade edges 16a' and 16a'', and 16b' and 16b'' into the sheathing (as in FIGS. 10 and 10a), and as also seen in FIG. 1d. Thereafter, the wire forward and rearward sections 10a and 10b are separated as in FIG. 1e to endwise strip the slugs 10aa and 10bb, off the wire cores, as also seen in FIG. 11. Dropping of the slug is also seen in FIG. 11, as is lowering of a wire guide lower sector B of guide 11b''', to release the slug. The upper guide sector is shown at A. A drive 130 is operable to lower and raise sector B.

Means to effect the described lateral movement of the blade carrier rods 80 and 81 in shown in FIGS. 3, and 6–8. As seen, a laterally extending lead screw 90 is rotatable by a drive motor 91, carried by frame part 83. See connecting shaft 93. As screw 90 rotates in one direction about its axis 90a, nuts 94 and 95 on the screw threads travel axially oppositely (see arrows 96 and 97) to move rod 80 to the right and rod 81 to the left, as in FIGS. 9 and 10. See connectors 98 and 99 connecting nut 94 with rod 81, and connectors 100 and 101 connecting nut 95 with rod 80. A pair of parallel lead screws 90 may be utilized for these purposes, as see in FIG. 8, each driven by the motor 91, with one lead screw associated with blades 16a and 16b, and the other associated with blades 17a and 17b. Balanced force transmission to the two sets of blades is thereby effected. See also frame elements 110–116 supporting the structure, as indicated. Bearings appear at 117 and 118. An additional tubular wire guide is seen at 119.

Figure 13A:
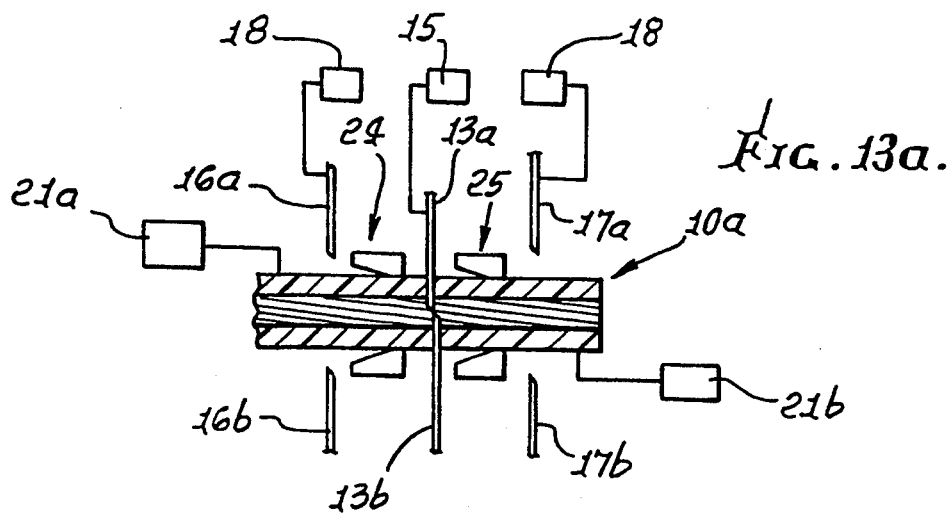
FIGS. 13a-13d are diagrammatic views showing additional steps in the method of wire or cable processing.
Figure 13B:
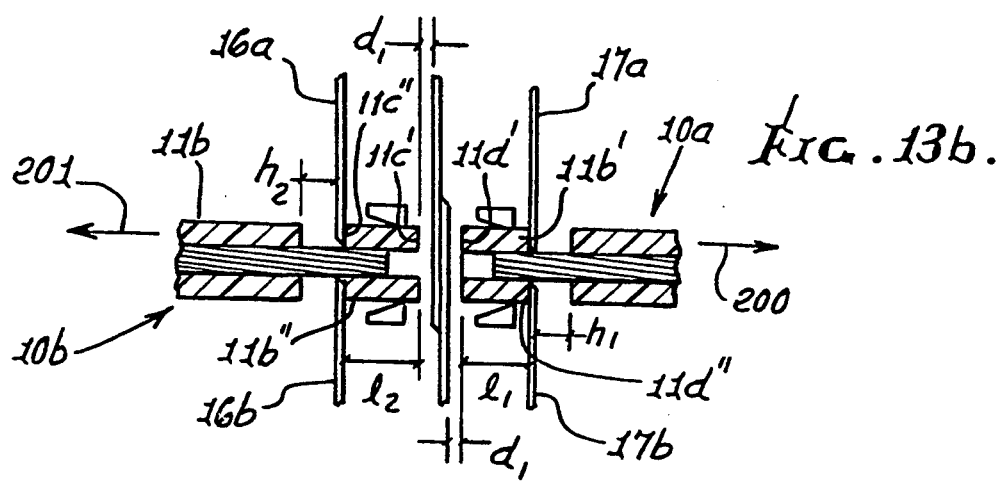

Referring now to FIGS. 13a–13b, the elements which correspond to those in FIGS. 1a)–1f) bear the same numerals. FIG. 13a corresponds to FIG. 1c; and FIG. 13b corresponds to FIG. 1e. In FIG. 13b, prior to the time the blades 16a, 16b, 17a, and 17b penetrate into the sheathing 11b, the wire sections 10a and 10b are displaced, endwise axially oppositely, to controlled extent as by drives 21a and 21b, under computer control, so as to control such displacement. See for example the displacements $d_1$. This in effect controls the length $l_1$ and $l_2$ of slugs of insulation 11b' and 11b'', as between slug ends 11c' and 11c'' and 11d' and 11d'', ends 11c'' and 11d'' being adjacent, respectively, the cutters 16a and 16b, and 17a and 17b which penetrate and cut the insulation.

Figure 13C:
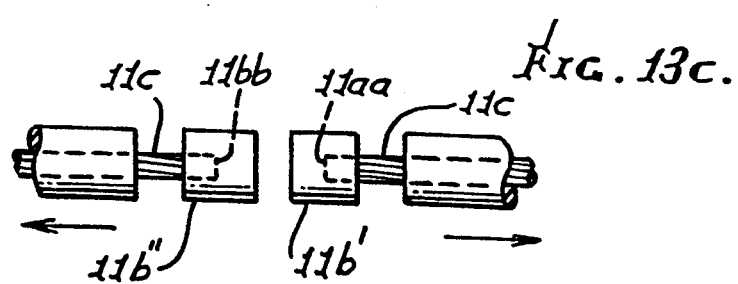
Figure 13D:

Thereafter, the blades 16a and 16b, and 17a and 17b penetrate into the sheathing, and wire sections 10a and 10b are displaced axially endwise oppositely (see arrows 200 and 201), to controlled extents $h_1$ and $h_2$ as by the computer-controlled drives 21a and 21b, to relatively displace the insulation slugs to positions shown in FIGS. 13b, 13c and 13d, wherein the slugs protectively overhang the cut ends 11aa and 11bb of wire core. This protects against fraying of ends of wire clustered strands as seen at 11c in FIGS. 13b–13d. The blades are then retracted, to leave the wire sections and slugs, as seen in FIG. 13c, the final product being seen in FIG. 13d. Note the exposed wire core extents 11f and 11g between the opposite end insulation slugs 11b' and 11b'', and the main extent 11j of insulation. The slugs are held in position on the core by friction, and may be pulled off at time of wire use.

In the above, the cutters can be oriented to move horizontally, or vertically, or in other directions.

In FIGS. 14–16, the blade arrangements and operations are the same as in FIGS. 1a–1f and 13a and 13b, the blades moving vertically. Note in this regard the blade actuators 180 and 181, carrying rods 80 and 81 seen in FIGS. 9–12. Such actuators are also seen in FIGS. 3 and 8. Drives for the actuators are schematically indicated at 15' in FIG. 16. Wire 10 passing endwise through the blade region is guided by guides 124 and 125, corresponding to guides 24 and 25 in FIGS. 1a–1f. As in FIG. 11, a part of each guide is movable away from a slug of insulation formed by closing of the blades as described above. In this embodiment, the two guides have parts 124a and 125a that are swingable away from the wire axis—see the broken line position 124a' of guide part 124a in FIG. 14 for example. Guide parts that do not move away from the wire are indicated at 124b and 125b. A pin 127 pivotally attaches each part 124a and 125a to frame structure 128.

A reciprocating drive swings the part 124a to position 124a' and back, under the control of master control 35. That drive, for example, includes a motor 130, and linkage means, including interconnected links 131–134 operatively connected between the motor shaft 135" and the part 124a. A corresponding motor 130a and links 131a–134a are connected to part 125a to pivot same. Guide parts 124a and 125a have concave arcuate wire guide surfaces, as at 124aa.

Also provided is a pusher and drive therefor for displacing the pusher to bodily push against the side of the severed length of sheathing (slug) for ejecting same in operative conjunction with moving (pivoting) of the part 124a. See for example the reciprocating plunger 135, and its drive, connected to the same drive as used to pivot the part 124a.

In FIG. 14, the plunger 135 is connected to the linkage 133 and 132. See also FIG. 17 showing plunger 135 connected at 132a to link 132. The nose 135' of the plunger is shown pushing the wire slug 10aa to the left. A similar pusher is operated in conjunction with pivoting of wire guide part 125a. A wire guide opening appears at 140 in FIG. 14. Motors 130 and 130a operate in one direction (rotate 180°) and then operate in reverse (−180°) to drive the pushers and swingable guide parts.

Referring now to FIGS. 18a–18f, they correspond generally and respectively to FIGS. 1a–1f, insofar as successive blade positions in severing the wire 210 and stripping insulation therefrom are concerned. Thus, first cutter means includes the two wire-cutting blades 213a and 213b of a first set, located or carried for movement laterally toward and away from the wire axis 212. Second cutter means includes blades 216a and 216b located for movement toward and away from axis 212, for stripping sheathing from the wire at one axial side of blades 213a and 213b; and third cutter means includes blades 217a and 217b movable toward and away from axis 212, for stripping sheathing from the wire at the opposite axial side of blades 213a and 213b.

Blades 216a and 216b, and blades 217a and 217b, do not sever the wire, but closely approach the wire while cutting into sheathing 211, for stripping purposes. See FIGS. 18d and 18e. A drive 218 is connected at 218a to blades 213a, 216a and 217a to move them laterally and simultaneously toward and away from the wire; and a drive 219 is connected at 219a to blades 213b, 216b and 217b to move them laterally and simultaneously toward and away from the wire.

The blades are shown as thin, flat steel sheets, formed to have dovetailed tongue ends at $213a_1$, $216a_1$, $217a_1$, and at $213b_1$, $216b_1$, and $217b_1$. Such dovetailed ends are receivable in and gripped by dovetailed groove holders schematically indicated at 229 and 230, assuring ease of replacement of the blades, while also assuring positive gripping of the blades and their proper alignment.

Such holders 229 and 230 may be considered as parts of the drives 218a and 219a, respectively. The blades themselves have V-shaped cutting edges arranged in pairs in opposed relation. Thus, blades 213a and 213b have opposed V-shaped edges at $213a_2$ and $213b_2$, which sidewardly slidably overlap completely during wire severing (see FIG. 18b); blades 216a and 216b have opposed V-shaped edges at $216a_2$ and $216b_2$ which sidewardly slidably overlap to limited extent during sheathing stripping (see FIGS. 18d and 18e); and blades 217a and 217b have opposed V-shaped edges at $217a_2$ and $217b_2$ which sidewardly overlap to limited extent during sheathing stripping (see FIGS. 18d and 18e). Such opposed V-shapes of the cutting edges assure complete severing of the sheathing.

Figure 18A:
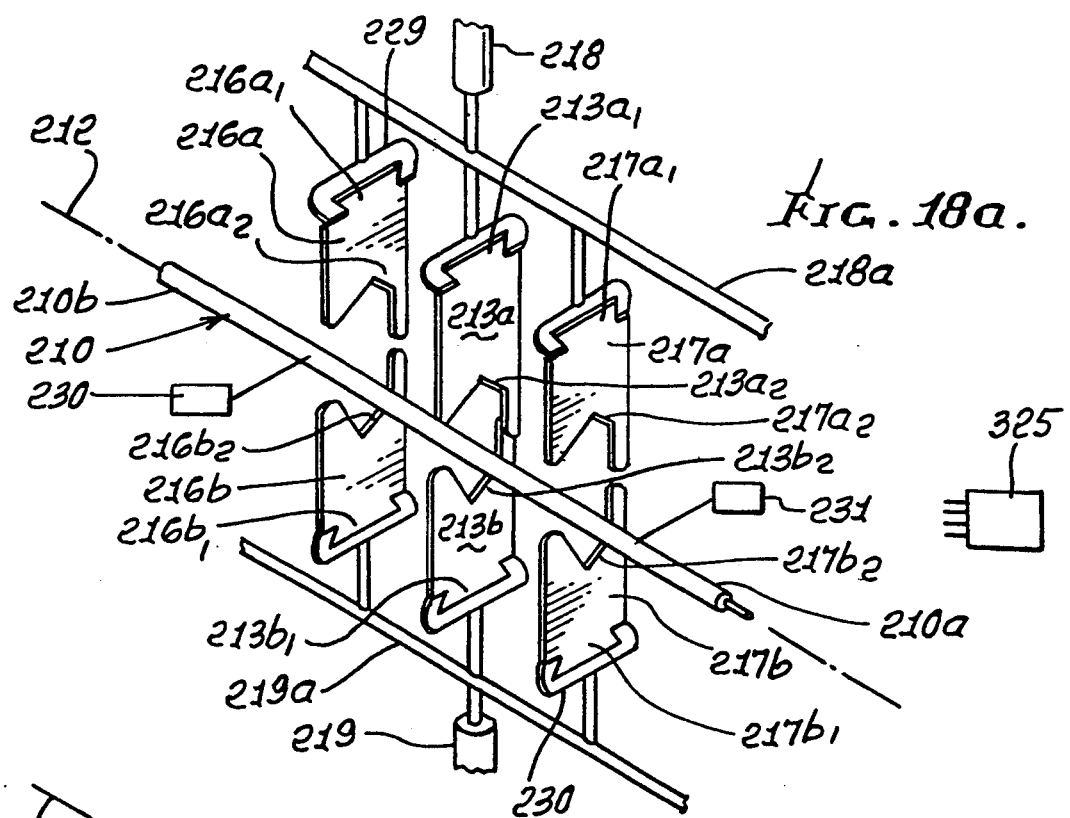
FIGS. 18a-18f are perspective views showing steps in the method of wire processing.
Figure 18B:
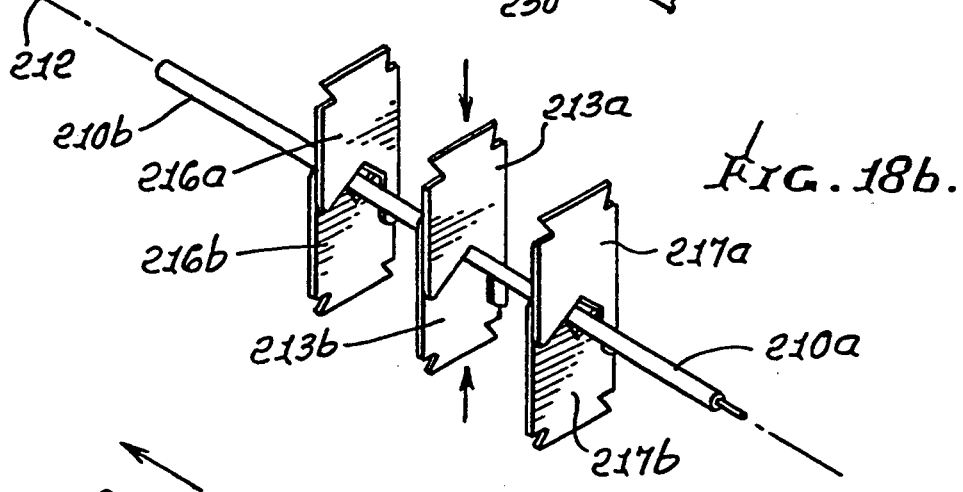

FIG. 18a shows wire 11 axially endwise advancement of the wire to first position. FIG. 18b shows the step of severing the wire thereby to form wire forward and rearward sections 210a and 210b, the blades 213a and 213b being advanced laterally toward the wire, from opposite sides, to accomplish severing.

Note that wire forward section 210a has a rearward end portion 210aa; and the wire rearward section 210b has a forward end portion 210bb.

Figure 18C:
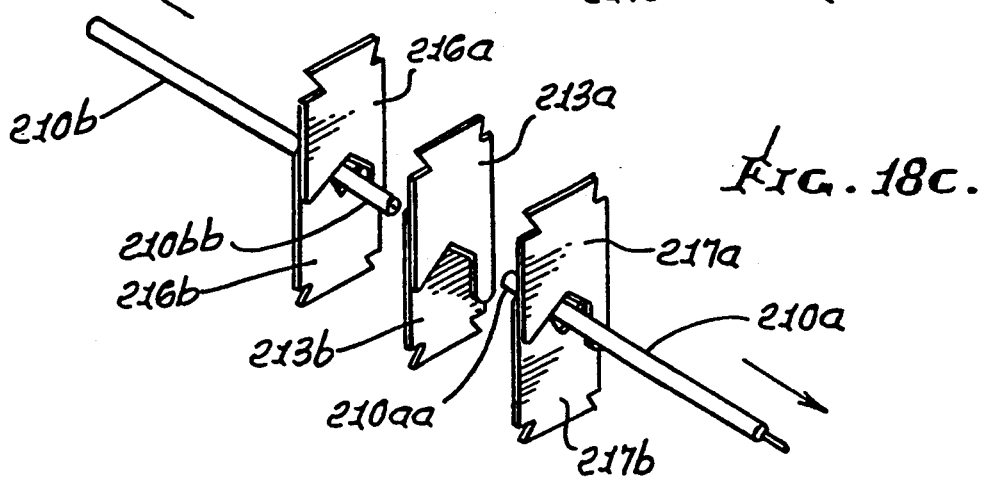

FIG. 18c shows the step of controllably separating the two sections 210a and 210b axially endwise oppositely, as to the positions shown, in which the end portions 210aa and 210bb are spaced from the closed-together blades 213a and 213b. Guides provided between the blade sets, serve to accurately guide the wire and the sections 210a and 210b during the cutting and severing operation. Such guides are seen for example in 524 and 525 in FIGS. 34, 35a, 35b, 35c, 37, 38, and 39. Note the tapered entrances 524a and 525a to the guides to receive and center the forwardly advanced wire.

Wire drives, schematically indicated at 230 and 231, are controllably operated to axially advance and separate the two wire sections 210a and 210b, as indicated in FIGS. 18a and 18c.

Figure 18D:
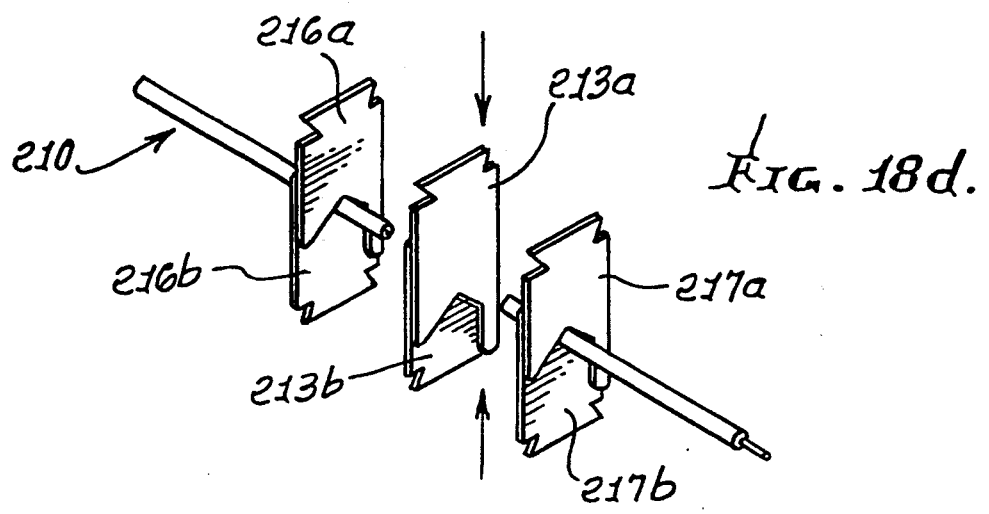

FIG. 18d shows a sub-step included within the step of stripping sheathing from the forward section rearward portion and from the rearward section forward portion thereby to expose wire ends at the portions. Note that blades 216a and 216b are simultaneously advanced laterally oppositely, as blades 217a and 217b are also simultaneously advanced laterally oppositely (and to the same extent if such stripping is to be equal for each wire section). Note that blades 213a and 213b now extend in laterally overlapping condition due to operation of blade drives 218 and 219 as one, i.e., equal downward lateral displacement for blades 213a, 216b and 217b, and equal upward lateral displacement for blades 213b, 216b and 217b; however, they may be separately driven so as not to extend in such relation, as shown. Blades 213a, 216a and 217a may be connected together to move downwardly to equal extent; and blades 213b, 216b and 217b are connected together to move upwardly as one, for extreme simplicity.

Figure 18E:
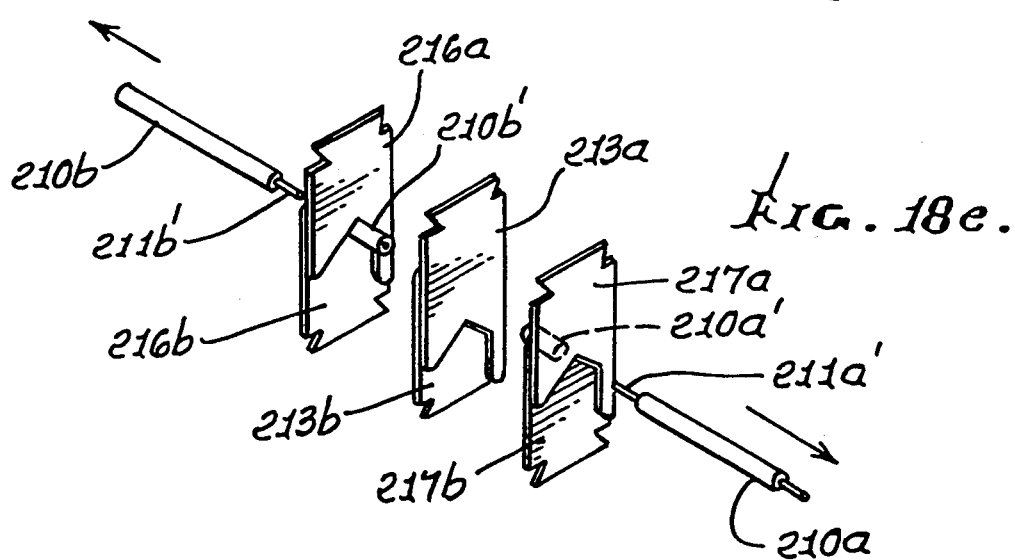

FIG. 18e shows operation of the wire drives 230 and 231 to further endwise separate the wire sections 210a and 210b so as to pull or strip two sheathing end portions 210a' and 210b' from the wire sections 210a and 210b, thereby to expose the wire core end portions 211a' and 211b'. The stripped sheathing end portions or slugs 210a' and 210b', are ejected, as will be seen, from between the pairs of guides 524 and 525 which may be shaped to provide for slug sideward de-confinement and ejection, as will be described further.

Figure 18F:
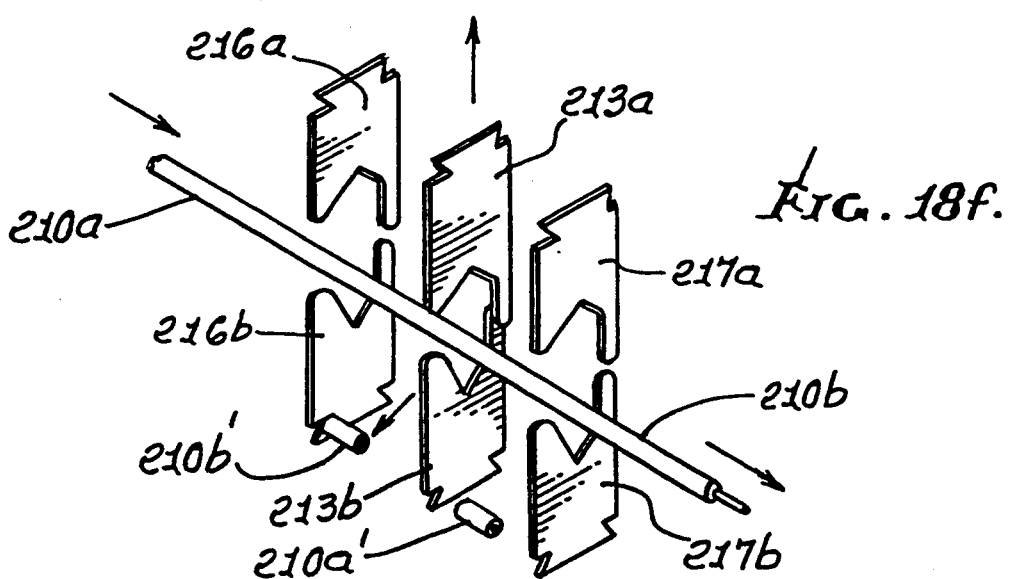

FIG. 18f shows all blades laterally retracted and the wire rearward section 210b fully advanced into position corresponding to FIG. 1a position for controlled length, endwise positioning to be processed, as in FIGS. 18b–18e to provide an exposed core end at its opposite end. Thus, controlled length wires (or cables), with exposed core lengths at each end of each wire, are efficiently and rapidly and controllably provided. See master control 325 to control all the drives, as described, and to be described.

Referring to FIGS. 19–25, apparatus to perform the operations described as respects FIGS. 18a–18f is shown in detail. A frame is provided as at 240–244 and 244a to mount conveyors, as represented by roller groups 245 and 246. These may be regarded as included within the wire drives 230 and 231, as mentioned. Such conveyors may include two rearwardly positioned endless belts 247 and 248; and two forwardly positioned endless belts 249 and 250. The belts 247 and 248 provide stretches, as at 247' and 248', which are adapted to sidewise flatly grip the wire or cable 210 (and specifically section 210b) for endwise advancement and retraction, as during separation of the wire sections 210a and 210b in FIG. 18c. Likewise, stretches 249' and 250', provided by belts 249 and 250, are adapted to sidewise grip the wire or cable 210 (and specifically the forward wire section 210a) for endwise advancement and retraction.

Belts 249 and 250 are driven to advance or retract the wire section 210a, as from a drive motor 252 (see FIG. 20). The output shaft 253 of the motor drives belt 254, as via a sprocket 255, and belt 254 drives shaft 256. Sprocket 255 also drives a belt 254a, which drives a shaft 257 via a pulley 257a. Shaft 256 drives another shaft 258, as via angular reversing gearing 259 and 260, in order to drive shaft 258, shaft 258' and upper conveyor belt 249 counterclockwise; whereas lower shaft 257, shaft 257' and lower conveyor belt 250 are driven clockwise, in FIG. 19. The conveyor belts drive the wire endwise in one axial direction; whereas, when the motor 252 is reversed, the wire is driven endwise in the opposite axial direction.

Figure 22:
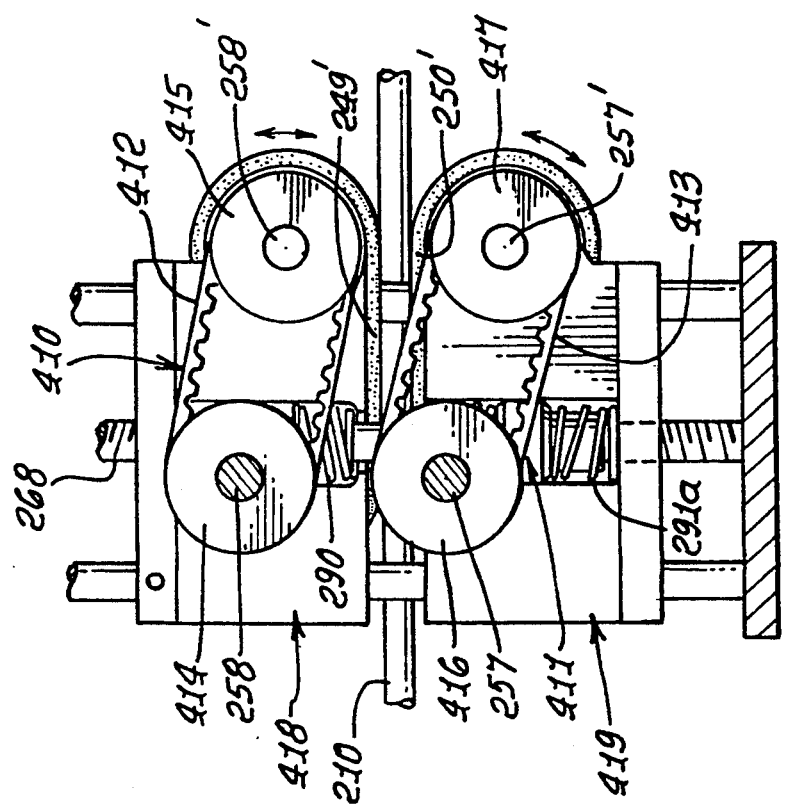
FIG. 22 is a section taken in elevation on lines 22—22 of FIG. 20.
Figure 21:
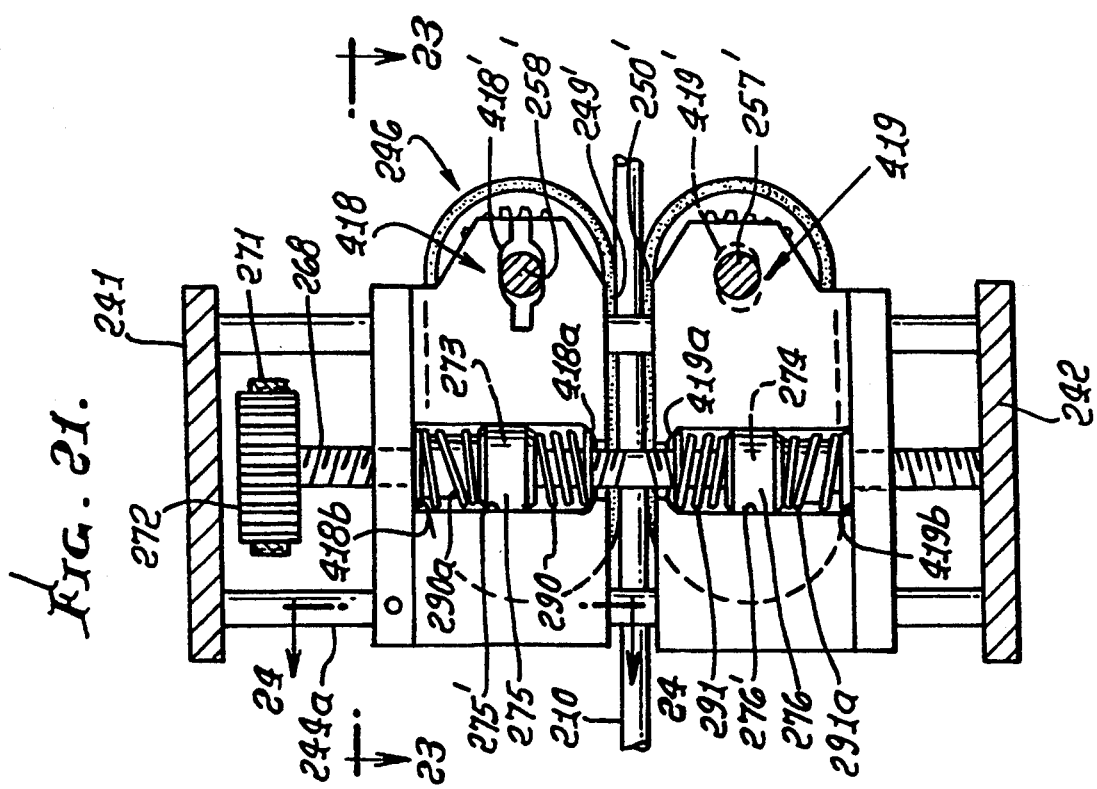
FIG. 21 is a section taken in elevation on lines 21—21 of FIG. 20.

FIG. 22 shows additional coupling 410 between offset shafts 258 and 258', and coupling 411 between offset shafts 257 and 257'. Such couplings include the timing belts 412 and 413, and timing gears 414 and 415, and 416 and 417, as shown. Shafts 257 and 258 are typically not pivotable (to swing bodily); whereas, shafts 257' and 258' may pivot, in effect, as their support plates 418 and 419 are moved up and down as lead screw 268 rotates. See the horizontal lost-motion, connection-type, bearing supports 418' and 419' for those shafts in FIG. 22. This allows the conveyor belt stretches 249' and 250' to be flatly and adjustably engaged and disengaged with the wire or cable 210, as seen in FIG. 22. See also FIG. 21.

FIG. 19 also shows conveyor rotors 260 and 261, and 262 and 263. These carry the belts 249 and 250. Axle 258" for rotor 261 is suitably driven by axle 258', as via a belt and pulleys; and axle 257" is suitably driven by axle 257', as via a belt and pulleys (see in FIG. 2 drive belts 14 and 15, etc.). Accordingly, when the belt stretches 249' and 250' are closed against the opposite sides of the wire 210b, and the motor 252 is operating, the wire is displaced endwise. Similar drives for conveyors 247 and 248 are provided, as shown.

Means is provided to move the conveyor belt stretches 249' and 250' relatively toward one another to clutch the wire, and away from one another to de-clutch the wire. See for example in FIGS. 19–21 the motor or drive 266 carried by a frame part 241 to rotate a vertical lead screw shaft 268, as via motor output shaft 269, sprocket 270, timing belt 271, and sprocket 272 on shaft 268. The screw shaft has screw thread engagement at 273 and 274 with nut members 275 and 276, associated respectively with plates 418 and 419.

Plate 418 supports the end of shaft 258', for up and down movement; and plate 419 supports the end of shaft 257' for up and down movement. Support of such shaft ends is via the lost-motion connections described above at 418' and 419'. Screw threaded connection to the nut 275 is oppositely "handed" relative to threaded connection to nut 276, so that when shaft 268 is rotated in one direction about its axis, the nuts 275 and 276, and plates 418 and 419 (and shafts 257' and 258') are yieldably displaced toward one another, whereby conveyor stretches 249' and 250' may clamp the wire; and when the shaft 268 is rotated in the opposite direction about its axis, the nuts and plates are yieldably displaced away from one another, and the wire is de-clutched. Nuts 275 and 276 are confined in vertical slots 275' and 276' in plates 418 and 419, allowing relative movement between the nuts and plates.

Compression springs 290 and 291 are provided (see FIGS. 22) between the nuts and the supports 418 and 419 to yieldably urge the supports 418 and 419 toward one another, in response to lead screw 268 rotation in one direction, to provide clearance "take-up" for better control of wire gripping, especially for smaller diameter wires. Those springs engage shoulders 418a and 419a, as shown. Additional compression springs 290a and 291a are provided between the nuts and shoulder 418b and 419b to yieldably urge the plates and shafts apart as the lead screw rotates in the opposite angular direction. Similar structures are associated with the conveyors 247 and 248, and bearing the same identifying numbers.

The rearward conveyor unit 245 embodies conveyor belt drive, and up/down movement the same as described in connection with unit 246 in FIGS. 19–22. The drive motor 252a (not shown) for driving the belt stretches 247' and 248' forwardly and reversely is similar to motor 252, and corresponds to motor 66 in FIGS. 2. The motor to control belt clamping of the wire is seen at 266a in FIG. 19. Mechanism operation between such rearward motors and the respective belts 247 and 248 is the same as mechanism between motors 266 and 252, and belts 249 and 250. The forward and rearward belt motors 252 and 252a are typically operated simultaneously, either to drive the wire or wire sections forwardly, as in FIGS. 18a and 18f, or to drive the wire sections endwise oppositely, as in FIGS. 18c and 18e. A master control to control all drives in a predetermined manner is seen at 325, in FIG. 18a.

Figure 31:
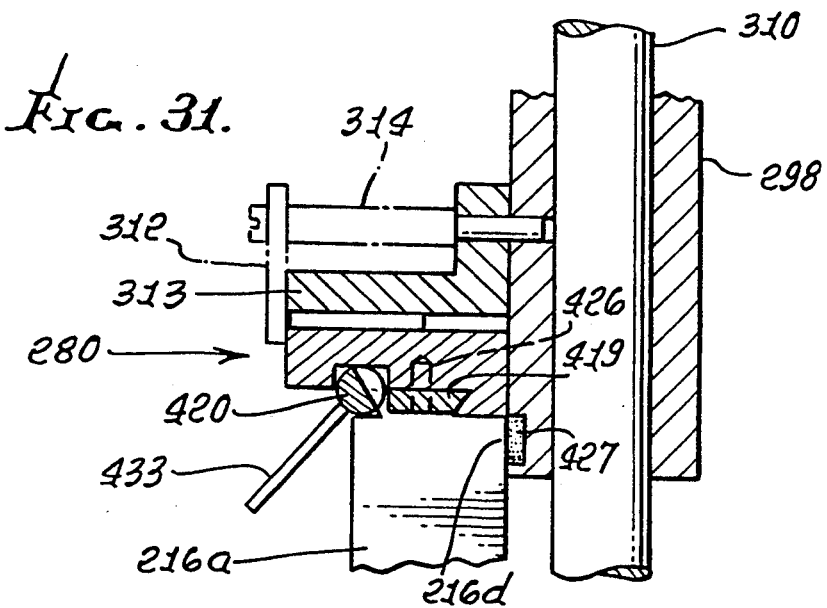
FIG. 31 is an enlarged vertical section taken on lines 31—31 of FIG. 30 showing blade retention means.

In FIGS. 25, 30 and 31, blades 213a, 216a, and 217a at the upper side of the wire are interconnected, as by the laterally extending blade holder 280, and the blades 213b, 216b and 217b at the lower side of the wire are interconnected by laterally extending blade holder 281, vertically spaced from holder 280. Those holders are vertically movable toward one another to effect wire severing, as by V edges of blades 213a and 213b. Those holders are further movable toward one another to effect penetration into the sheathing of the edges of blades 216a, 216b, and 217a and 217b. Thereafter, the wire forward and rearward sections 210b and 210a are separated, axially, as in FIG. 18e, to endwise strip the insulation tubular slugs off the wire cores, a typical slug 210aa being ejected, as in FIG. 35c. That view also shows dropping of the ejected slug, away from the mechanism.

Means to effect the described lateral movement of the blade holders 280 and 281 is shown in FIGS. 19, 25 and 30. As seen, a vertical lead screw 290 is rotatable by a drive motor 291, carried by drive structure 292a–292c. Screw 290 bearings are indicated at 290a. Belt and pulley elements 501–503 connect motor 291 to the screw.

As screw 290 rotates in one direction about its axis, nuts 294 and 295 on the screw threads travel axially oppositely along the screw to move blade holder 280 down and holder 281 upwardly. See sliding blocks 298 and 299 connecting holder 280 with nut 294, and holder 281 with nut 295. Block bearings 298a and 299a slide along guide rods 310, carried by frame structure 292a and 292c.

Figure 32:
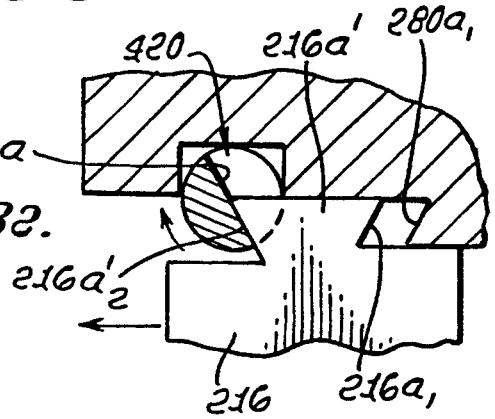
FIG. 32 is a further enlarged section showing a portion of FIG. 31, with a blade retention means in released position.
Figure 33:
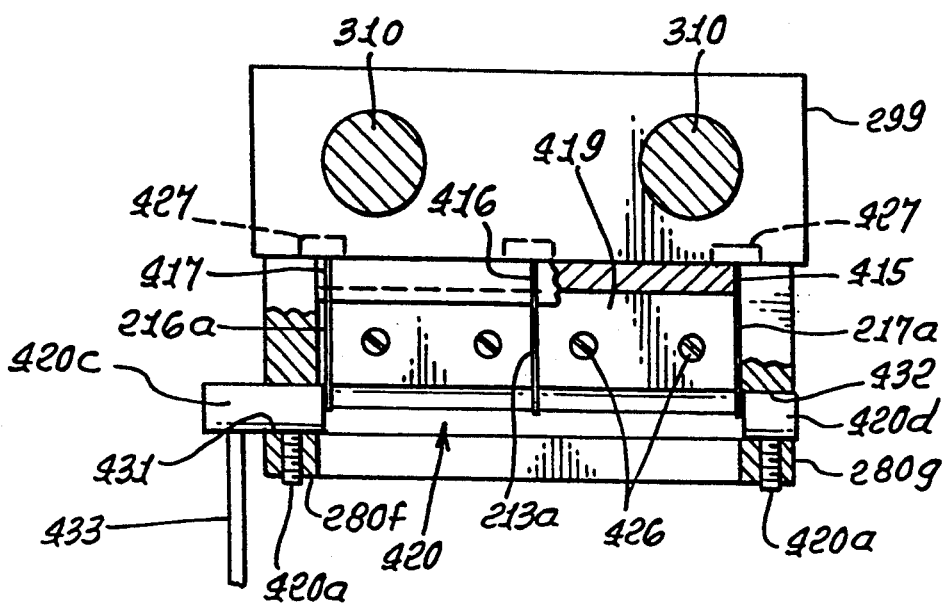
FIG. 33 is a horizontal plan view taken in section on lines 33—33 of FIG. 30.

In FIGS. 31-33, the blade holder 280 is held in interengagement at 311 with the block 298 by a clamp 312, which engages the front side of the holder at 313. A fastener 314 attaches the clamp to the block 298. Dovetailed tongue end 216a' of blade 216a has one angled edge surface 216a$_1$', engaged with correspondingly dovetailed surface 280a$_1$, for retention. A retainer in the form of a shaft 420 has an interior flat surface 420a rotatable into corresponding engagement with the oppositely angled surface 216a$_2$' of the blade, thereby to retain and locate the blade, vertically. Set screws 420a keep shaft 420 from rotating.

FIGS. 31 and 33 also show the dovetailed portions of three blades fitting in position, as in vertical slots 415-417 defined by a blade clamp bar or bars 419. Screws 426 attach bar or bars 419 to blade holder 280. Magnets 427, carried by the block 298, are positioned to magnetically attract vertical edge portions of the blades (as at 216d in FIG. 31) to keep the three blades positioned as they are initially received in slots 415-417, and prior to rotation of shaft 420, as described, into FIG. 31 position, to positively hold the blades. Shaft 420 has end extents 420c and 420d carried in bearing openings 431 and 432 in holder 280 parts 280f and 280g. See also manually rotatable handle 433 on shaft 420. Reverse rotation of shaft 420 allows quick, manual frontward reversal, and replacement of the blades.

Referring now to FIGS. 26-29, 34, 35a-35c, and 36, structure is shown that serves to guide the wire during its axial movement relative to the blades, and to facilitate removal of a severed slug or slugs or insulation or sheathing material.

Figure 34:
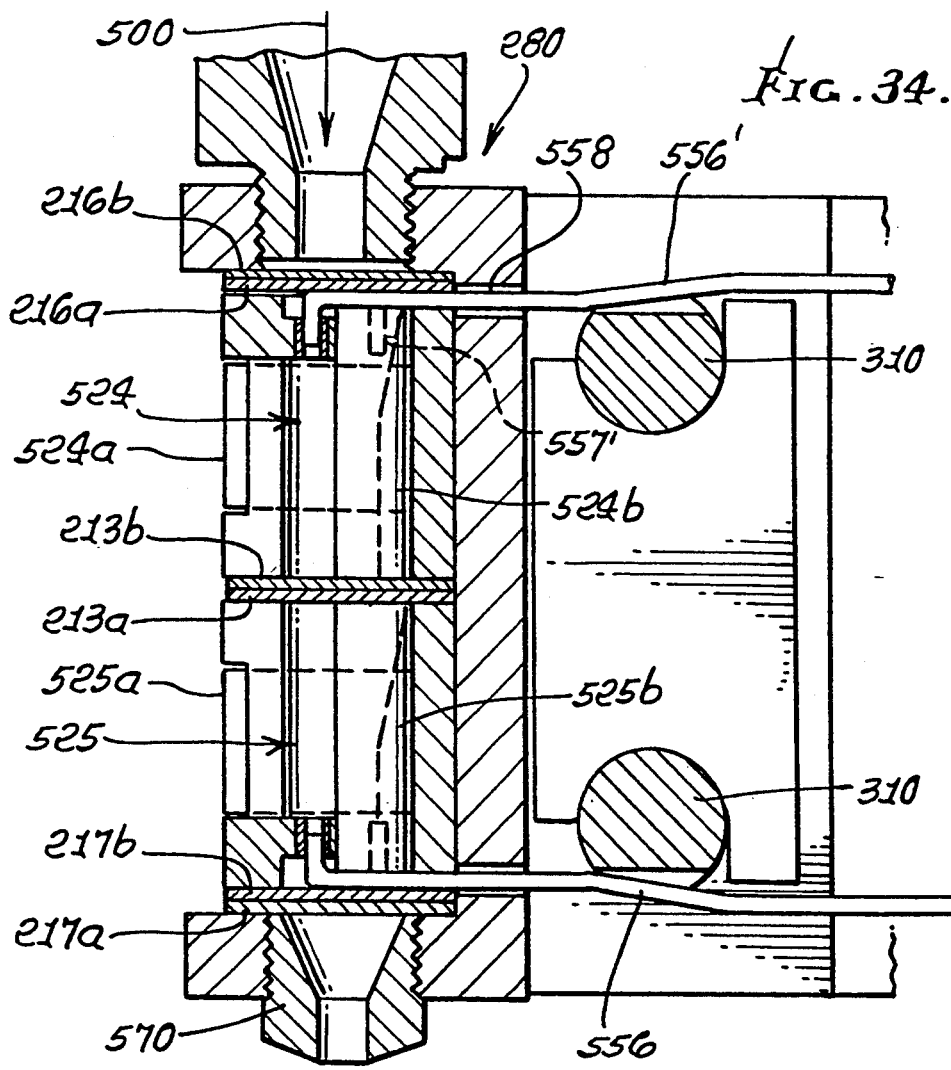
FIG. 34 is a horizontal plan view taken in section on lines 34—34 of FIG. 30.
Figure 36:
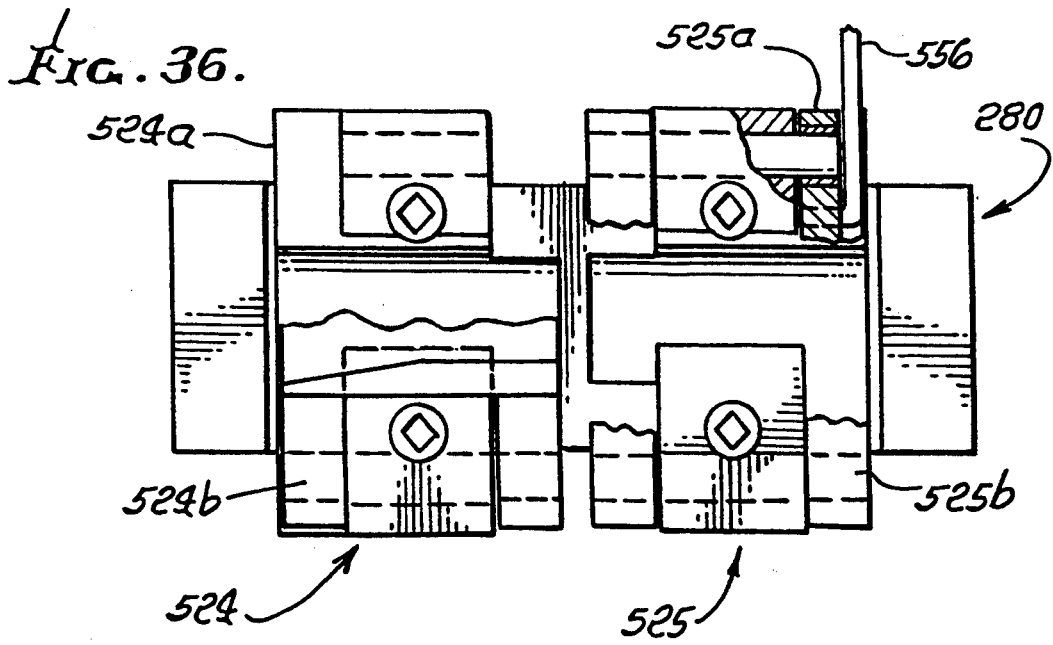

In FIG. 34, wire passing in horizontal direction 500 through the blade region is guided by two guides generally indicated at 524 and 525. A part of each guide is movable away from a slug of insulation formed by closing of the blades, and wire retraction, as described above. As shown, the two guides have parts 524a and 525a that are swingable laterally and upwardly, away from the wire axis, as better seen in FIG. 35c.

Figure 35A:
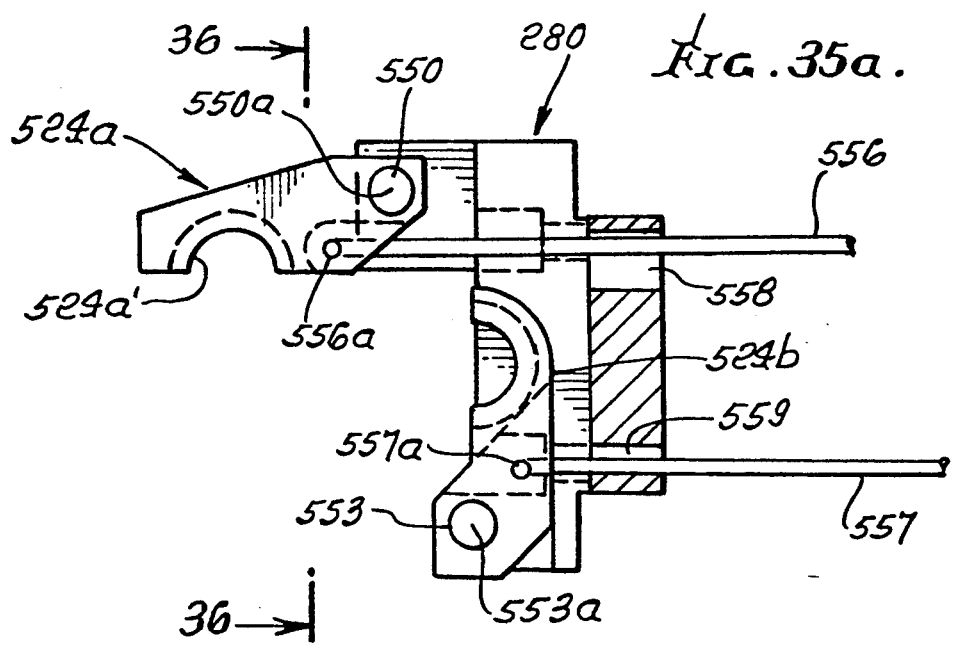
FIGS. 35a-35c are enlarged views showing actuation of wire slug trap door and pusher elements.
Figure 35B:
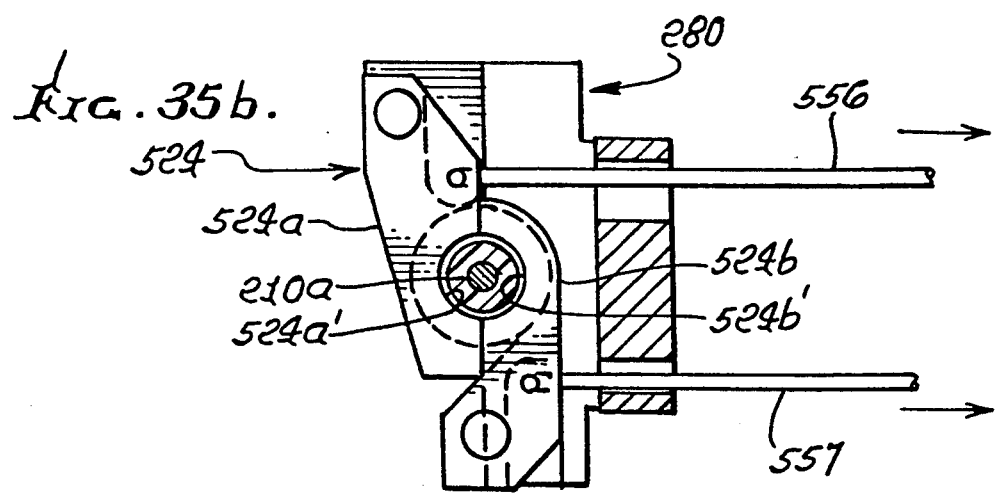

Guide part 524a is pivotally connected at 550 to blade holder 280, to swing about horizontal axis 550a extending parallel to the direction of wire advancement. Part 524a may be considered as a trap door, in the sense that when swung to FIGS. 35c and 35a positions, it has swung away from the side of the wire slug, leaving the slug free for ejection. Part 524a forms a semi-circular guide surface 524a' that guides the wire 210 when the part 524a is in closed position, as seen in FIG. 35b. Part 525a of guide 525 has construction and operation the same as described for part 524a.

The guides 524 and 525 also incorporate parts 524b and 525b which act as pushers, to bodily push against the sides of the severed lengths (slugs) of sheathing, for ejecting same laterally, in cooperative conjunction with pivoting movement of parts 524a and 525a, as described. Thus, part 524b is pivotally connected at 553 to blade holder 280, to swing about horizontal axis 553a, extending parallel to the direction of wire advancement.

Figure 35C:
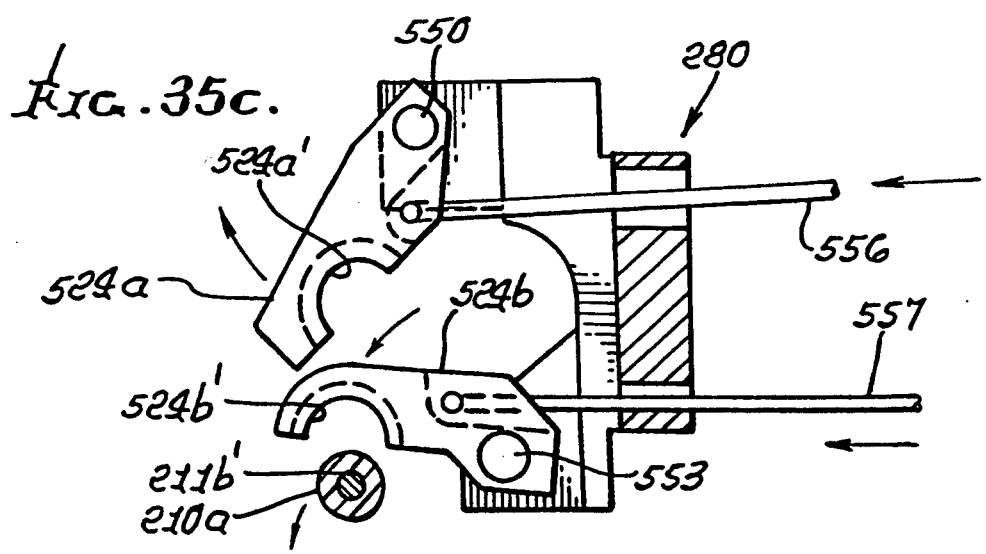
Figure 37:
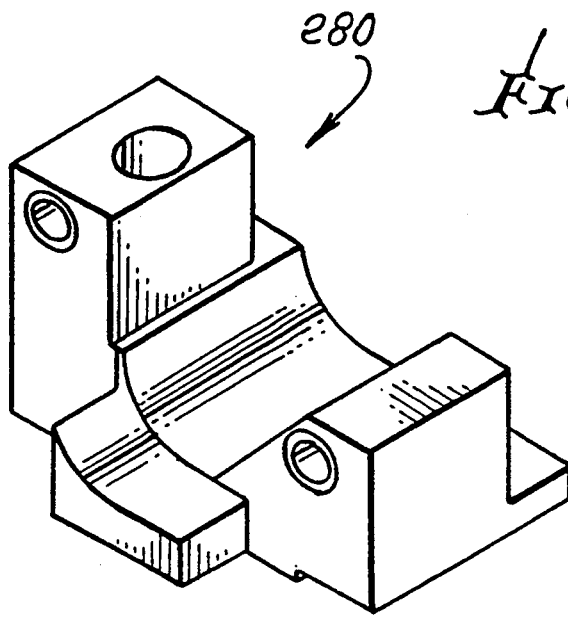
FIG. 37 is a perspective view of a wire guide element.
Figure 38:
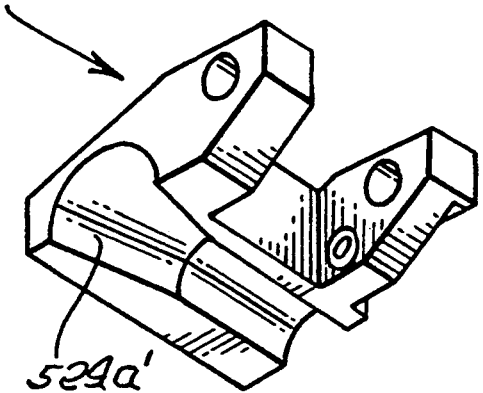
FIG. 38 is a perspective view of a wire slug trap door element.
Figure 39:
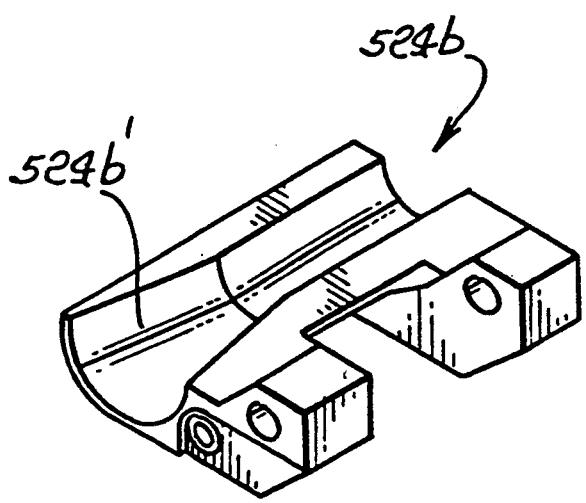
FIG. 39 is a perspective view of a wire slug pusher door element.

Part 524b may be considered as a pusher or ejector, in the sense that, as seen in FIG. 35c, it bodily ejects or displaces the wire slug 211b' laterally and downwardly, positively and assuredly away from the mechanism, immediately after the trap door part 524a opens (swings to the position seen in FIG. 35c). Part 524b has a semi-circular guide surface 524b' that guides the wire 210 when parts 524a and 524b are in closed positions, as seen in FIG. 35b.

Part 525b of guide 525 has a construction and operation the same as described for part 524a. Parts 524a and 524b lie between glades 216a and 216b, and blades 213a and 213b; and parts 525a and 525b lie between blades 213a and 213b, and blades 217a and 217b, as is seen from FIG. 34.

The trap door parts 524a and 524b, and pusher parts 524b and 525b, have associated reciprocating drives, to open and close them in timed relation, as described. See for example in FIGS. 35a-35c the links 556 and 557, respectively, pivotally connected with parts 524a and 524b, as at 556a and 557a, the links passing through guide openings 558 and 559 in the blade holder structure.

FIGS. 28 and 29 show link 556 driven by a motor 560, as via crank arm 561 connected to the motor shaft 560a, link 562 extending from 561 to a slider 563, and that slider also connected to link 557. Frame part 565 carries the motor. Link 557 is also driven by motor 560, as via crank arm 561, link 558 extending away from 561 to a slider 559', and that slider connected to link 557. Guide posts for the sliders appear at 563a and 559a. See also FIG. 29.

FIG. 34 shows corresponding actuating link 556' for the trap door part 524a, and link 557' for the pusher part 524b, these operated in the same way as links 556 and 557.

Finally, a sensor is provided to sense arrival of the wire endwise in proximity to the trap door parts and to the pusher elements, as described. See sensor 569 in FIG. 19.

FIGS. 34 and 40 show a tapered, tubular guide 570 at which the advancing wire end arrives after traversing the blade region.

In FIG. 40, the sensor takes the form of a very lightweight, swingable door 571 extending across the wire path, and hinged at 572 to swing forwardly upwardly in response to engagement by the traveling wire 210b forward end 210b'. Such swinging movement is sensed, as by an optical sensor. The latter typically includes a light beam (electromagnetic wave) source 574 producing a beam sensed at 575, such sensing occurring for example when the beam is interrupted by door swinging. This serves to notify the operator that the wire end has arrived at the sensor position, i.e., the wire has traversed the blade zone. For example, the sensor at 575 in FIG. 42 may control drive 325, so as to stop the advancement of the wire conveyors 249 and 250. See circuit connections 576 and 577.

An alternate position for the door is shown at 571', in closer proximity to the conveyor means 249 and 250.

Referring now to FIGS. 43-48, the multiple blade structures shown are adapted for use in apparatus of the type described above for processing wire to cut the wire into sections and to strip sheathing from the sections to expose section wire ends, the apparatus including conveyor means for displacing the wire axially endwise.

Figure 45:
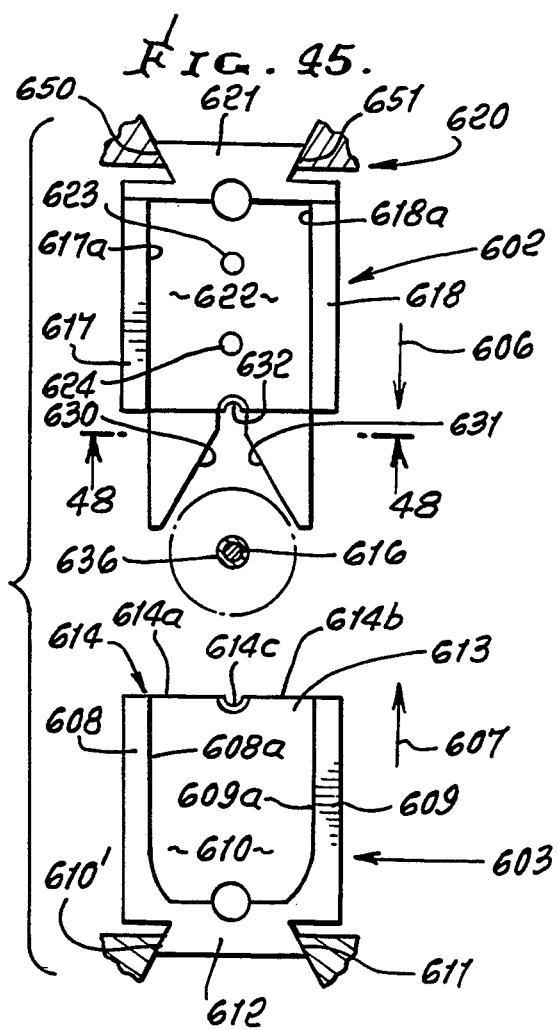
FIG. 45 is an elevation showing two blade structures that are movable in opposite directions to cut into a wire.
Figure 46:
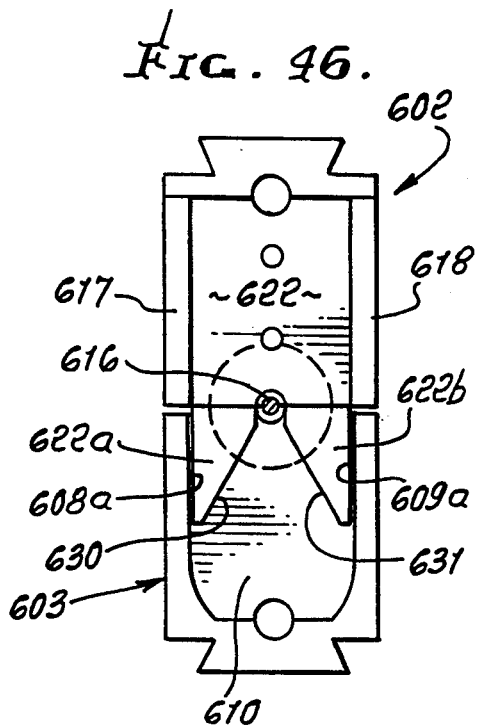
FIG. 46 is a view like FIG. 45 showing the two structures closed together in interfitting relation during wire cutting.
Figure 47:
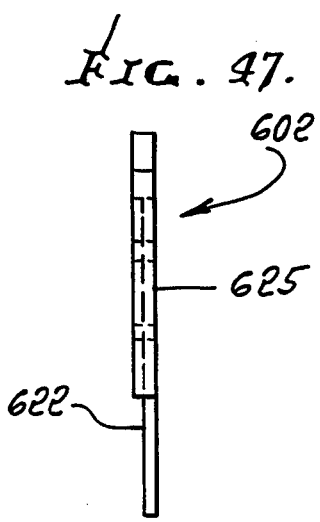
FIG. 47 is an edge view of the overlapping blades of the two blade structures seen in FIG. 46.
Figure 48:
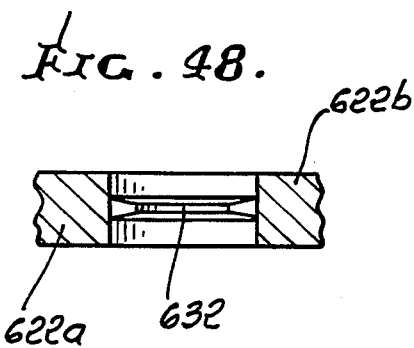
FIG. 48 is a section taken on lines 48—48 of FIG. 45.

As shown, upper and lower supports are provided at 600 and 601 for supporting multiple blade structures. The latter includes at least two of such structures, seen at 602 and 603, that mutually interfit as they are moved (by supports 600 and 601 for example) relatively oppositely toward and away from the axis 604 defined by the wire or cable 605 to be cut, in directions generally normal to that axis. See arrows 606 and 607. Referring also to FIG. 45, at least one of the structures (603 for example) defines first shoulders 608a and 609a on ribs 608 and 609, respectively, such shoulders being elongated in directions 606 and 607, and being laterally spaced and opposed, to form intermediate space 610 between which the other of the two structures (601 for example) or a portion thereof extends or relatively moves or slides as during such relative movement. Shoulders 608a and 609a may in this regard act as guide shoulders on blade-strengthening ribs 608 and 609; such structures also enhancing correct positioning for gripping and cutting of the cable by the upper structure (see FIG. 45), correct alignment of the blade structures normal to axis 604, correct closing of the blade structures, as seen in FIG. 46, gripping by lower support structure 601, as well as providing other benefits.

Gripping occurs at dovetail shoulders 610 and 611 on base portion 612 of the structure 603, of a thickness the same as that of ribs 608 and 609, and thicker than reduced thickness of the reduced blade plate 613 of 603, supported and stiffened by 608, 609, and 612. See also edge 614 of blade plate 603 which has portions 614a and 614b extending oppositely from a C-shape, medial or bridging cutting edge 614c that receives one half the wire metallic core 616 (see FIG. 44) without cutting into it, as during insulation stripping. Thus edge 614c cuts one half the insulation or sheathing 636. Elements 610, 608, 609, and 612 may be integral or of one piece (if metal).

The other or second blade structure (602 for example) defines second shoulders 617a and 618a on ribs 617 and 618, such shoulders also being elongated in directions 606 and 607, and being laterally spaced and opposed, to align ribs 617 and 618 with ribs 608 and 609, respectively, during relative structure movement. See aligned ribs in FIG. 46 at time of blade structure maximum closing, shoulder 617a aligning with shoulder 608a, and shoulder 618a aligning with shoulder 609a.

The ribs 617 and 618 are provided on a blade holder 620, which is part of 602, and is downwardly U-shaped, as shown, there being a base 621 integral with 617 and 618. An upper blade plate 622 is riveted at 623 and 624 to the flat section 625 of the holder, section 625 being integral with 617, 618 and 621, i.e., 622 fits between 617a and 618a. Thus, the upper blade plate is stiffened and strengthened by holder 620, to provide support for the downwardly extending legs 622a and 622b of 622 that fit closely between and are guided by rib shoulders 608a and 609a on 603, during closing together of the two blade structures, as seen in FIG. 46.

Figure 46A:
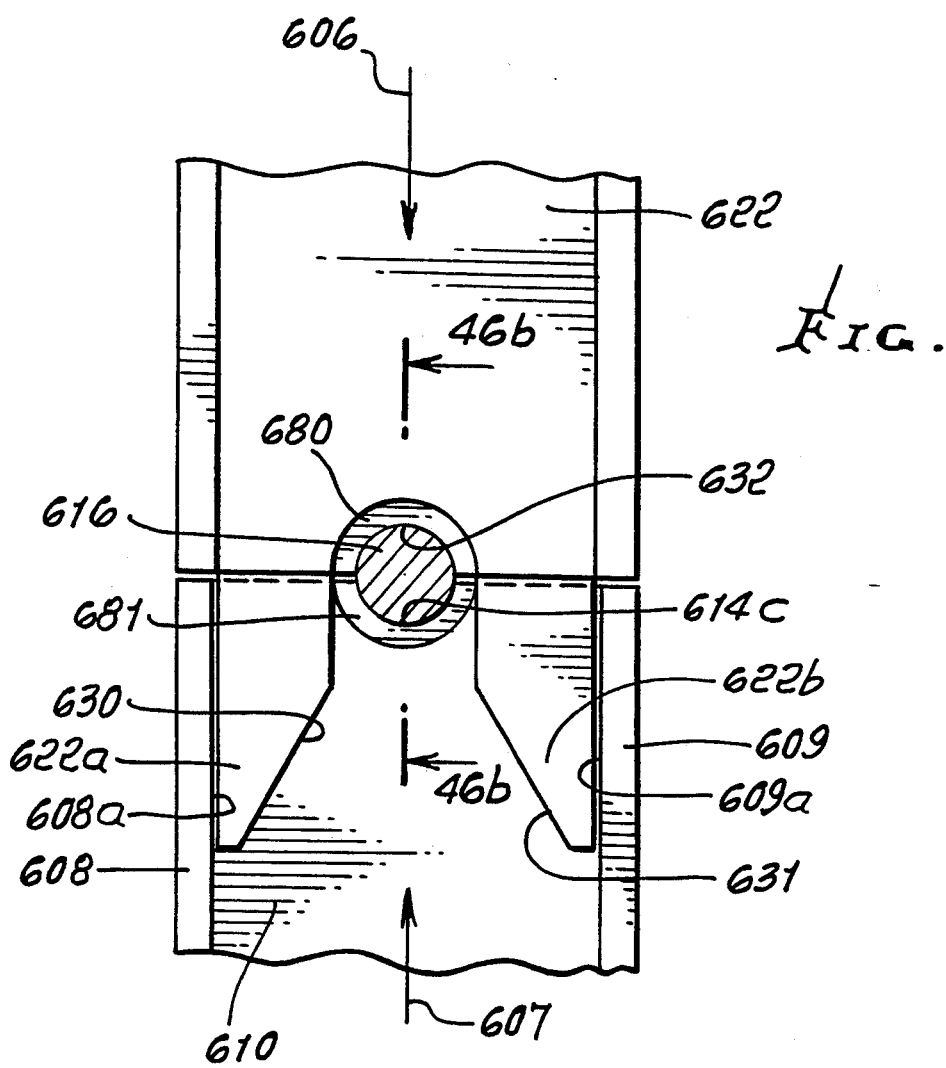
FIG. 46a is an enlarged view showing C-shaped cutting edges cutting sheathing.

Upwardly tapering wire guide edges 630 and 631 are provided on the two legs, and they terminate at a C-shaped medial or bridging cutting edge 632 that closes toward corresponding edge 614c to form a circular or oval-shaped opening to receive the uncut wire core during sheathing cutting and stripping. Edge 632 cuts through the remaining one half of the sheathing. See FIGS. 46a and 46b. That oval opening is of minimum diameter greater than wire core diameter, to allow slippage of the core through that opening as during stripping, to remove the sheathing slug, seen at 636a in FIG. 44, off the wire core.

Figure 46B:
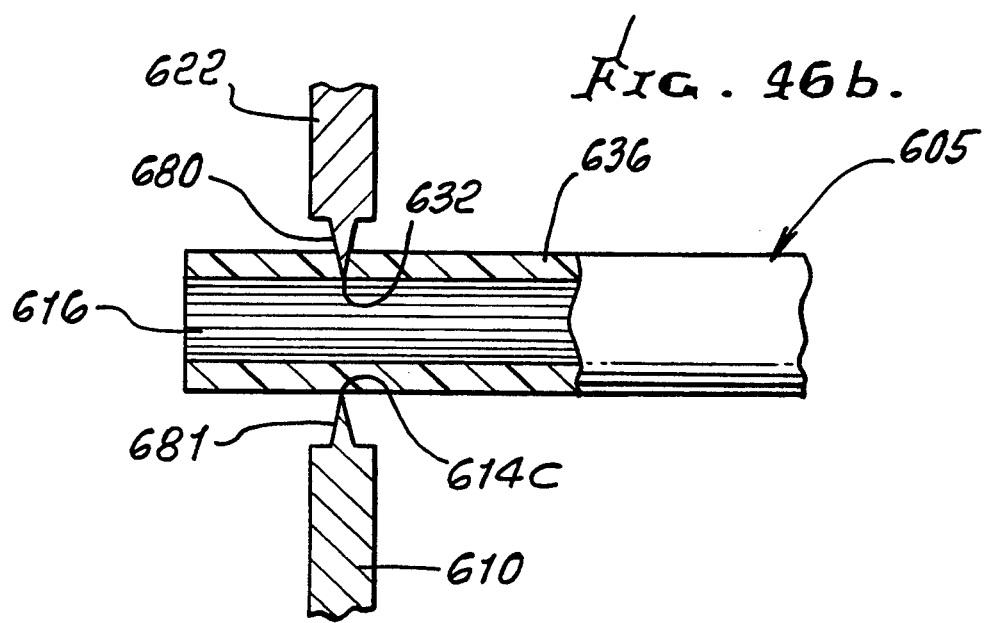

Note that during closing together of the blade plates, they extend in side-by-side interfitting and overlapping relation, as in FIGS. 46 and 46b; however, the C-shaped edges 614c and 632 are directly opposed, as are their tapered cutting edge bodies 680 and 681, whereby the end faces of the cut sheathing sections are pushed equally, endwise. Base 621 of the holder is thickened and forms dovetailed grip shoulders 650 and 651, with advantages as described above the shoulders 610 and 611.

In the modification seen in FIG. 50, the second shoulders are defined by opposite edges 640 and 641 of the legs 642 and 643 of upper blade plate 644, and shoulders 640 and 641 fit or slide adjacent rib shoulders 608a and 609a on the lower blade structure 603'. Tapered wire guide edges 642a and 643a are formed on legs 642 and 643, and urges the wire toward cutting position, as seen in FIG. 51. The upper blade structure 602' also includes strengthening holder 647 riveted at 648 to the upper blade plate 644, and forming dovetailed retention grip shoulders or edges 654 and 655, with the advantages of shoulders 650 and 651 described above. Gripping of the dovetailed shoulders, in support 600 and 601, proceeds as described in FIGS. 31–33 above. Retainers 670 and 671 in FIG. 43 correspond to retainer 420 in FIGS. 31–33. Handles 673 and 674 enable rotation of 670 and 671 to quickly grip and release the blade structures. Set screws 680 and 681 are adjustable to lock the rotary retainers in position.

FIG. 52 shows a further modification of an upper blade structure, with C-shaped edge 660 in a medial slot 660a, and above tapered wire guide edges 661 and 662 on the upper blade structure plate 663, otherwise similar to 641.

Figure 43:
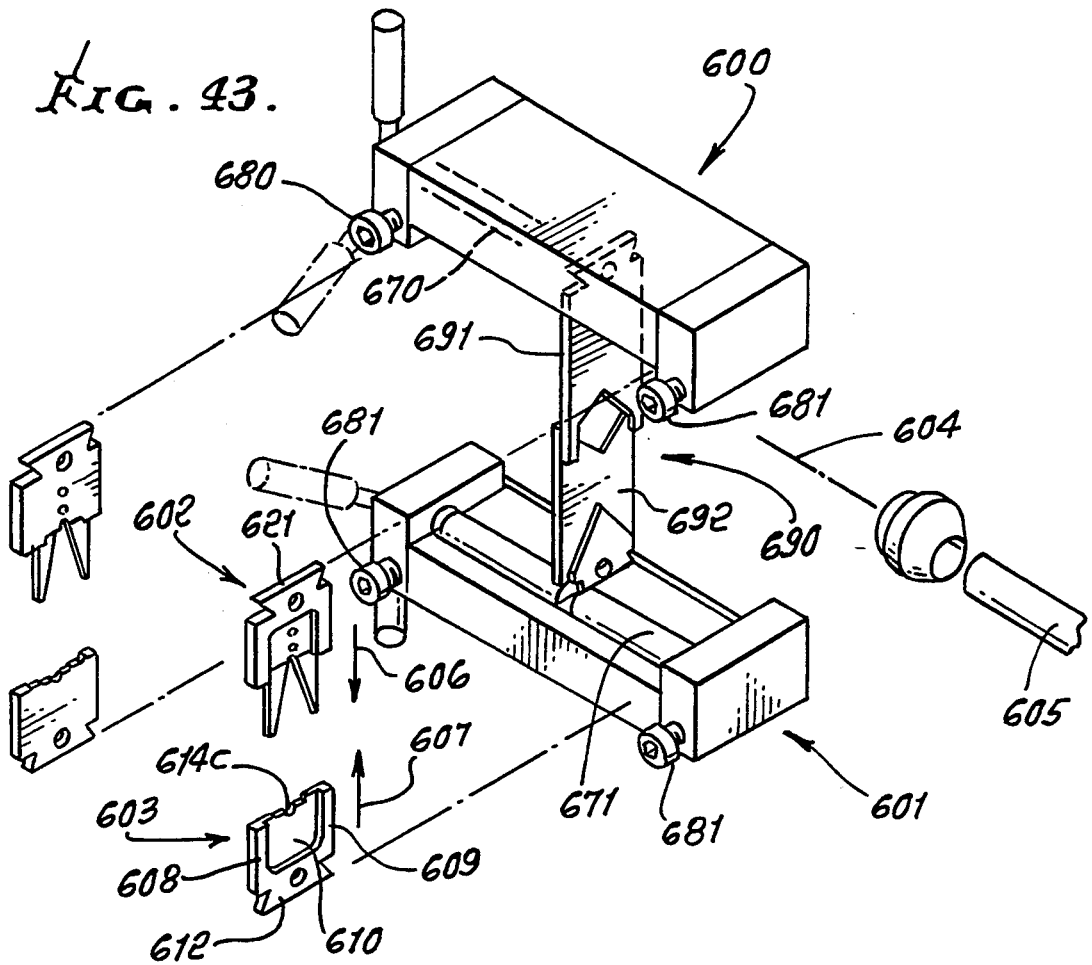
FIG. 43 is a view like FIG. 18(a) but showing a modification.
Figure 44:
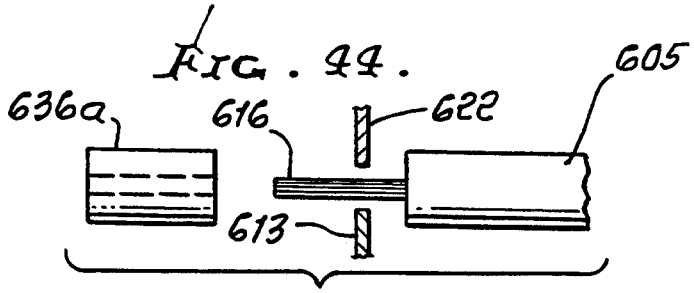
FIG. 44 is an elevation showing a wire sheathing slug removed from an exposed wire core end.
Figure 49:
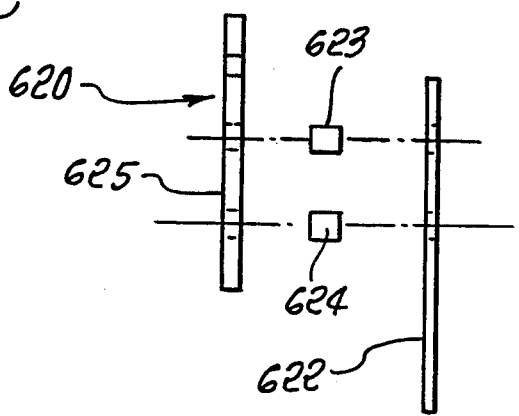
FIG. 49 is an exploded edge view showing a blade and its holder and rivets for interconnecting same.

In FIG. 43, a medial blade set 690 includes upper and lower blades 691 and 692 to cut completely through the wire when the supports are closed toward one another in the manner seen in FIG. 18e or in FIG. 10.

Accordingly, the invention provides a first set of multiple of the blade structures at one side of the axis and a second set of multiple of the blade structures at the opposite side of the axis, the retainer means including a first retainer carried by the support means at one side of the axis for rotary advancement to hold the multiple blade structures of the first set in the fixed position, and for rotary retractions to allow release of the blade structures of the first set. Also, the retainer means includes a second retainer carried by the support means at the opposite side of the axis for rotary advancement to hold the multiple blade structures of the second set in the fixed position and for rotary retention to allow release of the multiple blade structures of the second set. The multiple blade structure of each set include two or three of the pairs of blade structures, and typically two, as seen in FIG. 43, with an additional wire severing blade pair intermediate the two stripping pairs of blade structures, as shown.

I claim:

1. For use in apparatus for processing wire to cut the wire into sections and to expose section wire ends, the wire having an inner core and sheathing about said core, the apparatus including means for displacing the wire axially endwise, the combination comprising:

a) multiple blade structures, including at least two of said structures that mutually interfit as said two structures move relatively oppositely toward and away from said axis in directions generally normal to said axis, b) at least one of said two structures defining first shoulders elongated in said directions and forming a space between which the other of said two structures extends during said relative movement, c) each of said two structures having an associated concave cutting edge, said cutting edge associated with said one structure located between said first shoulders, d) each of said two concave cutting edges having a radius such that, when the two said structures are moved relatively toward each other to a certain position, the two said concave cutting edges cut through the wire sheathing to form an approximate circle that has a diameter approximately equal to the diameter of the inner core of the wire, e) and wherein said first shoulders are laterally spaced apart and face one another, said other of said two structures having second shoulders also elongated in said directions and extending in proximity with said first shoulders during said relative movement, said second shoulders respectively guiding along said first shoulders, f) and wherein said other of said blade structures include a blade and a blade holder carrying said blade, said second shoulders associated with at least one of said blade holder and blade.

2. The combination of claim 1 including programming means associated with said apparatus to provide programmable strip length of said sheathing.

3. The combination of claim 1 including rivet means attaching said blade holder to said blade.

4. The combination of claim 1 wherein said blade structures include blade plates having said wire cutting edges, said blade plates extending in close, parallel, overlapping relation during said relative movement.

5. The combination of claim 4 wherein there are wire guide edges on one of said blades that taper away from said axis and terminate at a bridging C-shaped cutting edge portion.

6. The combination of claim 4 wherein said cutting edges on two of said overlapping plates provide C-shaped edge portions forming said approximate circle when the blade plates have maximum overlap during said relative movement, said first shoulders then positioned at opposite sides of said approximate circle.

7. The combination of claim 2 wherein said first and second shoulders extend in endwise alignment with one another during said relative movement.

8. The combination of claim 2 wherein said first and second shoulders extend in laterally overlapping relation during said endwise movement.

9. The combination of claim 1 including support means for said blade structures for holding the blade structures attached in fixed positions on the support means, the blade structures having angled shoulders engageable with the support means.

10. For use in apparatus for processing wire to cut the wire into sections and to expose section wire ends, the wire having an inner core and sheathing about said core, the apparatus including means for displacing the wire axially endwise, the combination comprising:

a) multiple blade structures, including at least two of said structures that mutually interfit as said two structures move relatively oppositely toward and away from said axis in directions generally normal to said axis, b) at least one of said two structures defining first shoulders elongated in said directions and forming a space between which the other of said two structures extends during said relative movement, c) each of said two structures having an associated concave cutting edge, said cutting edge associated with said one structure located between said first shoulders, d) each of said two concave cutting edges having a radius such that, when the two said structures are moved relatively toward each other to a certain position, the two said concave cutting edges cut through the wire sheathing to form an approximate circle that has a diameter approximately equal to the diameter of the inner core of the wire, e) and wherein said first shoulders are laterally spaced apart and face one another, said other of said two structures having second shoulders also elongated in said directions and extending in proximity with said first shoulders during said relative movement, said second shoulders respectively guiding along said first shoulders, f) said cutting edges on two of said overlapping plates providing C-shaped edge portions forming said approximate circle when the blade plates have maximum overlap during said relative movement, said first shoulders then positioned at opposite sides of said approximate circle, g) and including retainers carried by the support means for holding the blade structures attached in fixed positions on the support means, there being manipulable means on the retainer means to effect retraction of the retainer means thereby to allow release of the blade structures from the support means, enabling their selective replacement.

11. The combination of claim 10 wherein said manipulable means include handle means.

12. The combination of claim 10 wherein the blade structures have primary angled shoulders engageable with said support means and secondary angled shoulders engageable by said retainer means upon rotary advancement thereof.

13. The combination of claim 12 wherein each blade structure has one of said primary angled shoulders and one of said secondary angled shoulders, said two angled shoulders defining a dovetailed configuration.

14. The combination of claim 10 wherein there are a first set of multiple of said blade structures at one position along said axis and a second set of multiple of said blade structures at another position along said axis, said retainer means including a first retainer carried by the support means at one side of said axis for rotary advancement to hold certain blade structures of the first and second sets in said fixed position, and for rotary retraction to allow release of the certain blade structures of the first and second sets.

15. The combination of claim 14 wherein said retainer means includes a second retainer carried by the support means at the opposite side of said axis for rotary advancement to hold other blade structures of the first and second sets in said fixed position and for rotary retraction to allow release of said other multiple blade structures of the first and second sets.

16. The combination of claim 14 wherein the multiple blade structures of the first and second sets includes one of the following:
two blade structures
three blade structures.

17. The combination of claim 14 including another multiple blade structure between two blade structures of said sets, and closable to sever said wire.

18. The combination of claim 5 wherein there are edges on the other of said blades that extend oppositely from a bridging C-shaped cutting edge portion.

19. The combination of claim 18 wherein said two C-shaped cutting edge portions form a wire core passing opening in closed position of said blades.

* * * * *

UNITED STATES PATENT AND TRADEMARK OFFICE
CERTIFICATE OF CORRECTION

PATENT NO. : 5,375,485
DATED : December 26, 1994
INVENTOR(S) : Jack L. Hoffa

It is certified that error appears in the above-identified patent and that said Letters Patent is hereby corrected as shown below:

Column 1,
Line 7, "This application is a continuation-in-part of application No.857,972, Mar. 26, 1992, Pat. No.5,293,683, issued Mar. 16, 1989, which is a continuation-in-part of Ser.No.659,557, Feb. 22, 1991, which is a continuation-in-part of Ser.No.611,057, filed Nov.9, 1990, now U.S. Pat.No.5,146,673 issued Sep. 15, 1992." should read
-- This application is a continuation-in-part of Ser.No.857,972, Mar.26,1992, Pat. No.5,293,683, which is a division of Ser.No.765,986, Pat.No.5,253,555 which is a continuation-in-part of Ser.No.07/659,557 abandoned, which is a continuation-in-part of Ser.No.611-057, Nov. 9, 1990, Pat. No.5,146,673. --

Signed and Sealed this

Eighteenth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 5,375,485
DATED : December 26, 1994
INVENTOR(S) : Jack L. Hoffa

It is certified that error appears in the above-identified patent and that said Letters Patent is hereby corrected as shown below:

Title page,
Item [63], Related U.S. Application Data, "This application is a continuation-in-part of application No.857,972, Mar. 26, 1992, Pat. No.5,293,683, issued Mar. 16, 1989, which is a continuation-in-part of Ser.No.659,557, Feb. 22, 1991, which is a continuation-in-part of Ser.No.611,057, filed Nov.9, 1990, now U.S. Pat.No.5,146,673 issued Sep. 15, 1992." should read
-- This application is a continuation-in-part of Ser.No.857,972, Mar.26,1992, Pat. No.5,293,683, which is a division of Ser.No.765,986, Pat.No.5,253,555 which is a continuation-in-part of Ser.No.07/659,557 abandoned, which is a continuation-in-part of Ser.No.611-057, Nov. 9, 1990, Pat. No.5,146,673. --

Column 1,
Line 7, "This application is a continuation-in-part of application No.857,972, Mar. 26, 1992, Pat. No.5,293,683, issued Mar. 16, 1989, which is a continuation-in-part of Ser.No.659,557, Feb. 22, 1991, which is a continuation-in-part of Ser.No.611,057, filed Nov.9, 1990, now U.S. Pat.No.5,146,673 issued Sep. 15, 1992." should read
-- This application is a continuation-in-part of Ser.No.857,972, Mar.26,1992, Pat. No.5,293,683, which is a division of Ser.No.765,986, Pat.No.5,253,555 which is a continuation-in-part of Ser.No.07/659,557 abandoned, which is a continuation-in-part of Ser.No.611-057, Nov. 9, 1990, Pat. No.5,146,673. --

This certificate supersedes Certificate of Correction issued January 18, 2005.

Signed and Sealed this

Nineteenth Day of April, 2005

JON W. DUDAS
*Director of the United States Patent and Trademark Office*

```
ERROR: interrupt
OFFENDING COMMAND: readhexstring

STACK:

true
(
)
```